(12) United States Patent
Muthiah

(10) Patent No.: US 10,877,900 B1
(45) Date of Patent: Dec. 29, 2020

(54) ENABLING FASTER AND REGULATED DEVICE INITIALIZATION TIMES

(71) Applicant: Western Digital Technologies, Inc., San Jose, CA (US)

(72) Inventor: Ramanathan Muthiah, Bangalore (IN)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 16/453,146

(22) Filed: Jun. 26, 2019

(51) Int. Cl.
*G06F 12/10* (2016.01)
*G06F 9/445* (2018.01)
*G06F 12/1009* (2016.01)

(52) U.S. Cl.
CPC ...... *G06F 12/1009* (2013.01); *G06F 9/44505* (2013.01); *G06F 2212/657* (2013.01)

(58) Field of Classification Search
CPC .................. G06F 12/1009; G06F 9/44505
See application file for complete search history.

(56) References Cited

U.S. PATENT DOCUMENTS

| | | | |
|---|---|---|---|
| 5,371,714 A | 12/1994 | Matsuda et al. | |
| 5,488,694 A | 1/1996 | McKee et al. | |
| 5,828,623 A | 10/1998 | Dilbeck | |
| 6,725,322 B1 | 4/2004 | Shiraishi et al. | |
| 8,195,912 B2 | 6/2012 | Flynn et al. | |
| 8,239,619 B2 | 8/2012 | Hung et al. | |
| 8,261,010 B2 | 9/2012 | Eom et al. | |
| 8,407,449 B1 | 3/2013 | Colon et al. | |
| 8,473,690 B1 | 6/2013 | Condict | |
| 8,489,854 B1 | 7/2013 | Colon et al. | |
| 8,935,302 B2 | 1/2015 | Flynn et al. | |
| 9,015,425 B2 | 4/2015 | Flynn et al. | |
| 9,223,662 B2 | 12/2015 | Flynn et al. | |
| 9,424,930 B2 | 8/2016 | Wood et al. | |
| 9,594,520 B2 | 3/2017 | Tomlin et al. | |
| 9,645,758 B2 | 5/2017 | Peterson et al. | |
| 10,133,663 B2 | 11/2018 | Atkisson et al. | |
| 2005/0273551 A1 | 12/2005 | Keays | |
| 2009/0150641 A1* | 6/2009 | Flynn | G06F 12/1018 711/202 |
| 2010/0228912 A1 | 9/2010 | Huang et al. | |
| 2010/0332729 A1 | 12/2010 | Alrod et al. | |
| 2012/0239860 A1 | 9/2012 | Atkisson et al. | |
| 2012/0281479 A1 | 11/2012 | Kochar et al. | |
| 2013/0031429 A1 | 1/2013 | Sharon et al. | |
| 2013/0229868 A1 | 9/2013 | Koh et al. | |
| 2018/0307558 A1* | 10/2018 | Chen | G06F 11/14 |
| 2019/0155746 A1* | 5/2019 | Bhatia | G06F 12/0246 |

\* cited by examiner

*Primary Examiner* — David E Martinez
(74) *Attorney, Agent, or Firm* — Patterson & Sheridan, LLP; Steven H. Versteeg

(57) ABSTRACT

A method and memory apparatus that operate to minimize and limit memory initialization time when powering up after an unexpected shutdown. Instead of relying only on a cached log table that is lost when memory powers down unexpectedly, the method and apparatus disclosed herein preserve the information needed to rebuild the log table within predefined memory locations. These predefined locations are optimized such that parallel sensing will capture initialization information for a certain number of word lines across all dies and planes within the memory structure during a single read operation at power up.

13 Claims, 12 Drawing Sheets

PRIOR
ART

ENABLING FASTER AND REGULATED DEVICE INITIALIZATION TIMES

BACKGROUND

Solid state drives may undergo two types of power shutdown: graceful shutdown (GSD) and ungraceful shutdown (UGSD). A graceful shutdown ensures that an address mapping table is stored/flushed on non-volatile memory before power is lost, thereby enabling faster initialization of the solid state drive when the solid state drive is next powered on.

Ungraceful shutdown is a case where power to the solid state drive is abruptly terminated without warning. This can happen in a power failure, battery power loss, or with certain solid state drive communication protocols such as Secure Digital (SD).

An UGSD increases the initialization time during the next power up of the solid state drive because the address mapping table must be rebuilt by reading each data block modified after the last flush of the address mapping table. With multiple open memory erase blocks, and with larger sizes of memory erase blocks, the initialization time delay increases further. Some protocols maintain a strict time constraint during initialization (e.g., one second for SD). Consequently, initialization timing margins become critical.

BRIEF SUMMARY

This disclosure relates to methods and an apparatus for managing logical to physical addressing data during storage operations in such a manner as to enable faster and regulated memory device initialization time, even after an ungraceful shutdown event.

One method disclosed herein comprises writing data blocks to word lines of a memory array. This method further comprises generating an index between a logical block address and a physical address for each of the data blocks on the memory array. Finally, this method comprises storing the index to a subsequent word line, in response to the number of the data blocks satisfying a flush threshold.

Another method disclosed herein comprises determining that an ungraceful shutdown event has occurred. This method further comprises reading an address mapping table from a memory array into volatile memory. This method further comprises reading one or more indexes in a single read operation, each index comprising logical block addresses for data blocks written after the address mapping table was last written to the memory array. Finally, this method comprises updating the address mapping table in the volatile memory to associate the logical block addresses of the one or more indexes with the data blocks stored after the address mapping table was written to the memory array such that an initialization operation satisfies a timing metric.

The apparatus disclosed herein comprises a memory array comprising a plurality of memory dies, each of the memory dies comprising a pair of planes, each of the planes comprising a physical erase block comprising a set of word lines, each of the word lines comprising non-volatile memory cells. This apparatus further comprises a logical erase block comprising a physical erase block from each of the memory dies. This apparatus further comprises a coarse recovery circuit configured to store an address mapping table to the memory array according to a predefined schedule. Finally, this apparatus comprises a fine recovery circuit configured to store an index on a subsequent logical word line in response to a controller storing data blocks to a predetermined number of logical word lines of the logical erase block, the predetermined number configured such that recovery of the address mapping table during an initialization operation satisfies a timing metric.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
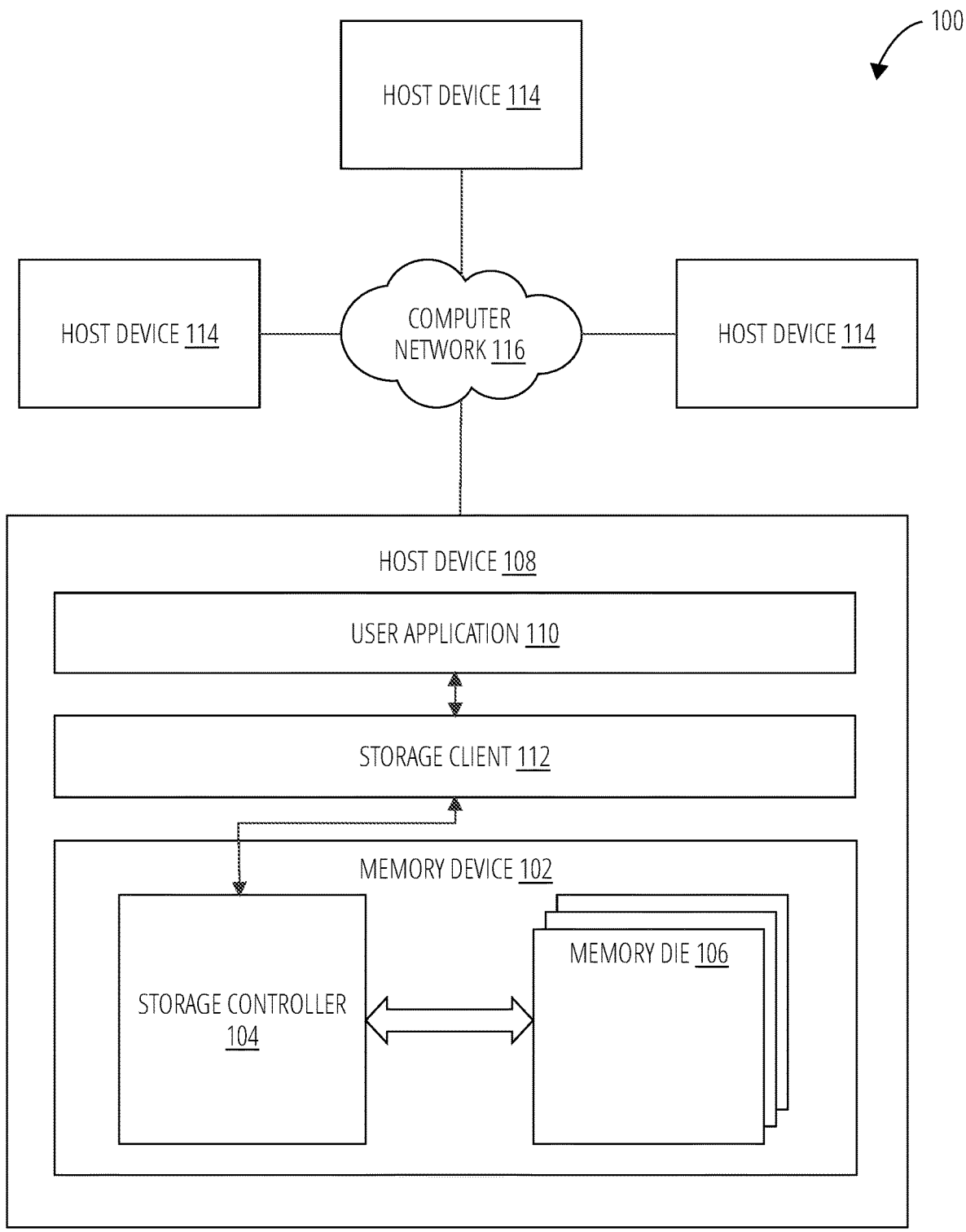
FIG. 1 illustrates a system 100 in accordance with one embodiment.

Although the exemplary embodiments are described in terms of FLASH memory, the techniques may be more generally applied to other types of non-volatile memory.

Embodiments are herein disclosed of a system, a method, and an apparatus to manage the initialization time of a solid state drive device. In certain embodiments, the system, method, and apparatus are configured to reduce the initialization time of a solid state drive device. In certain embodiments, the system, method, and apparatus are configured to keep the initialization time within a deterministic range across multiple initialization cycles. In certain embodiments, the system trades increased write amplification for faster device initialization times.

A relationship between a logical block address of a data block and its corresponding physical address is tracked for a set of data blocks and recorded in the next word line, or a subsequent word line, based on a flush distance (described below). The relationship is stored in one or more indexes in one or more separate data blocks on a word line along with other user data. The method of storing the one or more indexes may be further tuned for single-level cell (SLC), multi-level cell (MLC), and triple-level cell (TLC) memory cells based on their performance over the life of the device to maintain a desired initialization latency within a specified protocol limit.

In one embodiment the frequency of storing the one or more indexes is adapted based on the health of an erase block receiving the one or more indexes. The health of an erase block may be monitored across multiple program/erase cycles of the non-volatile memory (e.g., FLASH) to maintain a controlled initialization latency with ageing of the erase block. Additionally, the health of an erase block may be based on a Bit Error Rate (either, or both, uncorrectable bit error rate UBER or correctable bit error rate BER) for data blocks from the erase block that are decoded over the life of the erase block.

In another embodiment, storing the one or more indexes is based on a host device memory access pattern, for example a sequential access pattern or random access pattern. The flush distance may be configured based on the randomness of host device storage command behavior.

The one or more indexes may be stored in the next, or subsequent word line in non-volatile memory in a zig-zag pattern to enable improved parallel read access of the one or more indexes.

In certain embodiments, all of the data blocks storing the one or more indexes are sensed, or read, in parallel from all the physical blocks and the relationships between the logical block addresses and the physical addresses is generated efficiently and with low latency. This is because the logical address to physical address relationships exist on the storage media in a condensed form versus what would be sensed sequentially in a conventional approach. Furthermore, the error correcting code (ECC) decoding is limited to the data blocks storing the one or more indexes and is not needed for all the data blocks in the entire erase block.

Depending on the number of open blocks in the system and the time available for initialization, the system may determine a frequency for writing the one or more indexes into the non-volatile memory in conjunction with carrying out host device write commands. As the non-volatile memory ages, the latency changes incurred in sensing across SLC and TLC blocks, as well as the delay involved in ECC decoding, may all affect a dynamic frequency used by the system for writing the one or more indexes.

During normal operation the address mapping table (or a cached portion thereof) is in volatile memory and changes frequently. In certain embodiments, the system stores a modified portions of the address mapping table for the memory array that have not yet been flushed (i.e., preserved) to non-volatile memory at certain intervals. Alternatively, the system stores a complete copy of the address mapping table for the memory array to non-volatile memory at certain intervals. This storing of a copy of modified portions of the address mapping table, or the whole table, is referred to herein as a "master flush." The interval used may be based on a time period or on writing a certain amount of data.

Performing a master flush at a predetermined interval together with certain embodiments of the claimed solution ensures that at any point in time during operation of the solid state drive, there is only one sense required to re-initialize the solid state drive in the event of an unexpected power loss, ungraceful shutdown (UGSD). Adjusting the frequency of the master flush may require more than one sense to complete an initialization operation. The system may be tuned to meet a required initialization latency for different device configurations based on various parameters such as the health of erase blocks, based on the health of certain word lines within an erase block, based on a predetermined health metric, timing metrics required at system startup, a pattern of host commands, a type of erase block such as SLC or TLC, number of open erase blocks, frequency of master flushes, and the like.

Design factors may include, but are not limited to, a number of data blocks covered by each index, a number of word lines covered by each index, and the frequency of master flushes relative to the number of indexes written to the memory array, and the like. The number and the type of erase blocks open at any point during operation of the solid state drive may also be a design factor.

FIG. 1 is a schematic block diagram illustrating one embodiment of a system 100 for improving performance in a solid-state storage device in accordance with the present invention. The system 100 includes a memory device 102, a host device 108, at least one host device 114, and a computer network 116, which are described below.

The system 100 includes at least one memory device 102, comprising a storage controller 104 and one or more memory die 106. In some embodiments, the system 100 may include two or more memory devices. Each memory device 102 may include two or more memory die 106, such as flash memory, nano random access memory ("nano RAM or NRAM"), magneto-resistive RAM ("MRAM"), dynamic RAM ("DRAM"), phase change RAM ("PRAM"), etc. In further embodiments, the data memory device 102 may include other types of non-volatile and/or volatile data storage, such as dynamic RAM ("DRAM"), static RAM ("SRAM"), magnetic data storage, optical data storage, and/or other data storage technologies. The memory device 102 is described in more detail with respect to FIG. 5 and FIG. 2.

The memory device 102, also referred to herein as a storage device, may be a component within a host device 108 as depicted in here, and may be connected using a system bus, such as a peripheral component interconnect express ("PCI-e") bus, a Serial Advanced Technology Attachment ("serial ATA") bus, or the like. In another embodiment, the memory device 102 is external to the host device 108 and is connected, a universal serial bus ("USB") connection, an Institute of Electrical and Electronics Engineers ("IEEE") 1394 bus ("FireWire"), or the like. In other embodiments, the memory device 102 is connected to the host device 108 using a peripheral component interconnect ("PCI") express bus using external electrical or optical bus extension or bus networking solution such as Infiniband or PCI Express Advanced Switching ("PCIe-AS"), or the like.

In various embodiments, the memory device 102 may be in the form of a dual-inline memory module ("DIMM"), a daughter card, or a micro-module. In another embodiment, the memory device 102 is a component within a rack-mounted blade. In another embodiment, the memory device 102 is contained within a package that is integrated directly onto a higher level assembly (e.g. mother board, lap top, graphics processor). In another embodiment, individual components comprising the memory device 102 are integrated directly onto a higher level assembly without intermediate packaging.

In a further embodiment, instead of being connected directly to the host device 108 as DAS, the data memory device 102 may be connected to the host device 108 over a data network. For example, the data memory device 102 may include a storage area network ("SAN") storage device, a network attached storage ("NAS") device, a network share, or the like. In one embodiment, the system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host device 108 and the data memory device 102.

The system 100 includes at least one host device 108 connected to the memory device 102. Multiple host devices may be used and may comprise a host, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a host device 108 may be a client and the memory device 102 operates autonomously to service data requests sent from the host device 108. In this embodiment, the host device 108 and memory device 102 may be connected using a computer network, system bus, Direct Attached Storage (DAS) or other communication means suitable for connection between a computer and an autonomous memory device 102.

The depicted embodiment shows a user application 110 in communication with a storage client 112 as part of the host device 108. In one embodiment, the user application 110 is a software application operating on or in conjunction with the storage client 112. The storage client 112 manages files and data and utilizes the functions and features of the storage controller 104 and associated memory die 106. Representative examples of storage clients include, but are not limited to, a server, a file system, an operating system, a database management system ("DBMS"), a volume manager, and the like. The storage client 112 is in communication with the storage controller 104 within the memory device 102.

In one embodiment, the system 100 includes one or more clients connected to one or more host device 108 through one or more computer networks. A host device 114 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The computer network 116 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network 116 may also include a network from the IEEE 802 family of network technologies, such Ethernet, token ring, WiFi, WiMax, and the like.

The computer network 116 may include servers, switches, routers, cabling, radios, and other equipment used to facilitate networking the host device 108 or host devices and host device 114 or clients. In one embodiment, the system 100 includes multiple host devices that communicate as peers over a computer network 116. In another embodiment, the system 100 includes multiple memory devices 102 that communicate as peers over a computer network 116. One of skill in the art will recognize other computer networks comprising one or more computer networks and related equipment with single or redundant connection between one or more clients or other computer with one or more memory devices 102 or one or more memory devices 102 connected to one or more host devices. In one embodiment, the system 100 includes two or more memory devices 102 connected through the computer network 116 to a host device 114 without a host device 108.

In one embodiment, the storage client 112 communicates with the storage controller 104 through a host device interface 502 (described in relation to FIG. 5) comprising an Input/Output (I/O) interface. For example, the memory device 500 may support the ATA interface standard, the ATA Packet Interface ("ATAPI") standard, the small computer system interface ("SCSI") standard, and/or the Fibre Channel standard which are maintained by the InterNational Committee for Information Technology Standards ("IN-CITS").

In certain embodiments, the storage media of a memory device is divided into volumes or partitions. Each volume or partition may include a plurality of sectors. Traditionally, a sector is 512 bytes of data. One or more sectors are organized into a block (referred to herein as both block and data block, interchangeably).

In one example embodiment, a data block includes eight sectors which is 4 KB. In certain storage systems, such as those interfacing with the Windows® operating systems, the data blocks are referred to as clusters. In other storage systems, such as those interfacing with UNIX, Linux, or similar operating systems, the data blocks are referred to simply as blocks. A block or data block or cluster represents a smallest physical amount of storage space on the storage media that is managed by a storage manager, such as a storage controller, storage system, storage unit, storage device, or the like.

In some embodiments, the storage controller 104 may be configured to store data on one or more asymmetric, write-once storage media, such as solid-state storage memory cells within the memory die 106. As used herein, a "write once" storage media refers to storage media that is reinitialized (e.g., erased) each time new data is written or programmed thereon. As used herein, an "asymmetric" storage media refers to a storage media having different latencies for different storage operations. Many types of solid-state storage media (e.g., memory die) are asymmetric; for example, a read operation may be much faster than a write/program operation, and a write/program operation may be much faster than an erase operation (e.g., reading the storage media may be hundreds of times faster than erasing, and tens of times faster than programming the storage media).

The memory die 106 may be partitioned into memory divisions that can be erased as a group (e.g., erase blocks) in order to, inter alia, account for the asymmetric properties of the memory die 106 or the like. As such, modifying a single data segment in-place may require erasing the entire erase block comprising the data, and rewriting the modified data to the erase block, along with the original, unchanged data. This may result in inefficient "write amplification," which may excessively wear the memory die 106. Therefore, in some embodiments, the storage controller 104 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation).

Management of a data block by a storage manager includes specifically addressing a particular data block for a read operation, write operation, or maintenance operation. A block storage device may associate n blocks available for user data storage across the storage media with a logical address, numbered from 0 to n. In certain block storage devices, the logical addresses may range from 0 to n per volume or partition. In conventional block storage devices, a logical address, also referred to as a logical block address (LBA), maps directly to a particular data block on physical storage media. In conventional block storage devices, each data block maps to a particular set of physical sectors on the physical storage media.

However, certain storage devices do not directly or necessarily associate logical addresses with particular physical data blocks. These storage devices may emulate a conventional block storage interface to maintain compatibility with a block storage client 112.

In one embodiment, the storage controller 104 provides a block I/O emulation layer, which serves as a block device interface, or API. In this embodiment, the storage client 112 communicates with the storage device through this block device interface. In one embodiment, the block I/O emulation layer receives commands and logical addresses from the storage client 112 in accordance with this block device interface. As a result, the block I/O emulation layer provides the storage device compatibility with a block storage client 112.

In one embodiment, a storage client 112 communicates with the storage controller 104 through a host device interface 502 comprising a direct interface. In this embodiment, the storage device directly exchanges information specific to non-volatile storage devices. A storage device using direct interface may store data in the memory die 106 using a variety of organizational constructs including, but not limited to, blocks, sectors, pages, logical blocks, logical pages, erase blocks, logical erase blocks, ECC codewords, logical ECC codewords, or in any other format or structure advantageous to the technical characteristics of the memory die 106.

The storage controller 104 receives a logical address and a command from the storage client 112 and performs the corresponding operation in relation to the memory die 106. The storage controller 104 may support block I/O emulation, a direct interface, or both.

Figure 2:
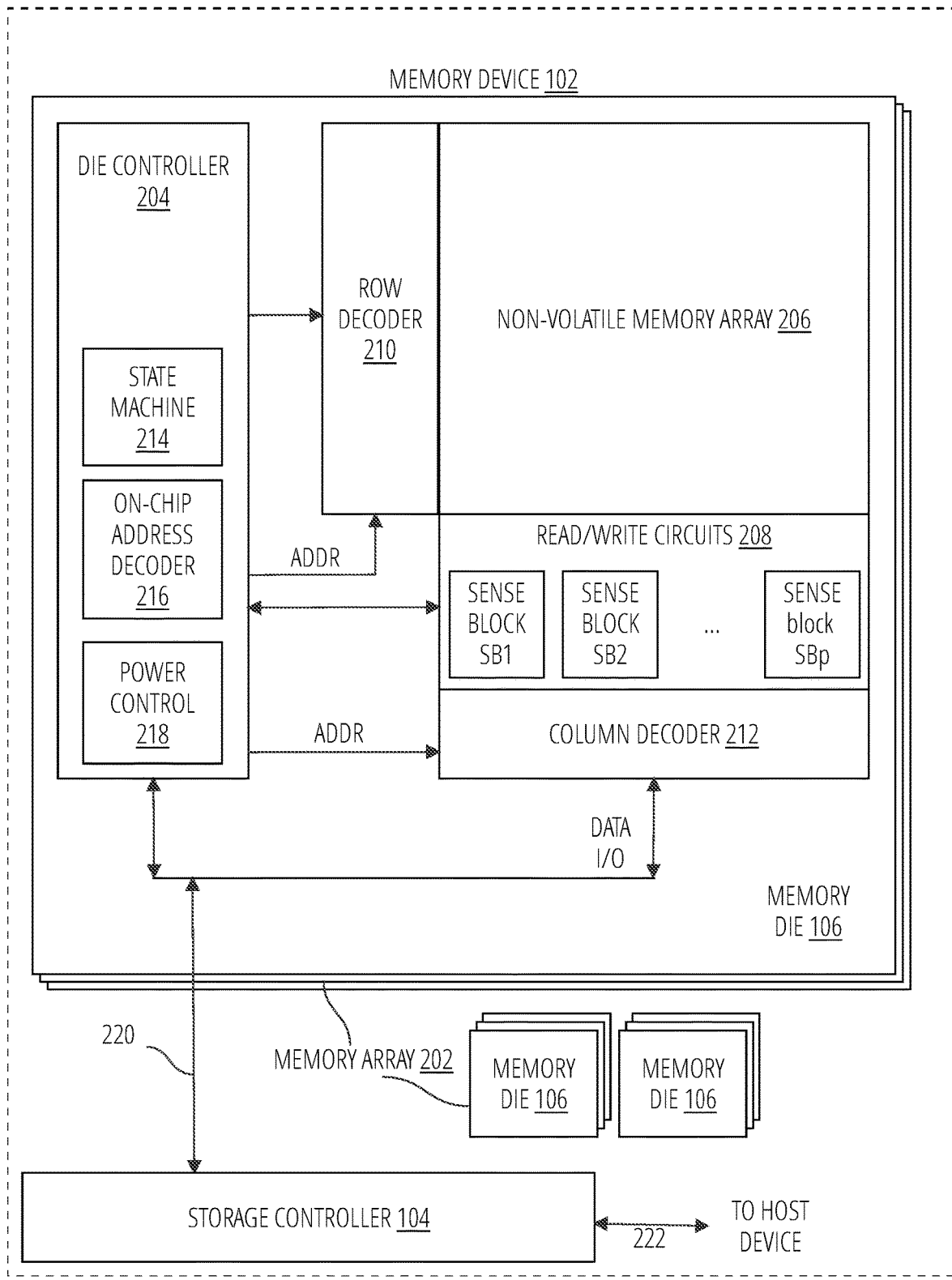
FIG. 2 is a block diagram of an example memory device 102 in another embodiment.

FIG. 2 is a block diagram of an exemplary memory device 102. The memory device 102 may include a storage controller 104 and a memory array 202. The each memory die 106 may include a die controller 204 and at least one non-volatile memory array 206 in the form of a three-dimensional array, and read/write circuits 208.

In this context, "memory array" refers to a set of memory cells (also referred to as storage cells) organized into an array structure having rows and columns. Consequently, a non-volatile memory array is a memory array having memory cells configured such that a characteristic (e.g. threshold voltage level, resistance level, conductivity, etc.) of the memory cell used to represent stored data remains a property of the memory cell without a requirement for using a power source to maintain the characteristic.

A memory array is addressable using a row identifier and a column identifier. Those of skill in the art recognize that a memory array may comprise the set of memory cells within a plane, the set of memory cells within a memory die, the set of memory cells within a set of planes, the set of memory cells within a set of memory die, the set of memory cells within a memory package, the set of memory cells within a set of memory packages, or with other known memory cell set architectures and configurations.

A memory array may include a set of memory cells at a number of levels of organization within a storage or memory system. In one embodiment, memory cells within a plane may be organized into a memory array. In one embodiment, memory cells within a plurality of planes of a memory die may be organized into a memory array. In one embodiment, memory cells within a plurality of memory dies of a memory device may be organized into a memory array. In one embodiment, memory cells within a plurality of memory devices of a storage system may be organized into a memory array.

The non-volatile memory array 206 is addressable by word line via a row decoder 210 and by bit line via a column decoder 212. The read/write circuits 208 include multiple sense blocks SB1, SB2, . . . , SBp (sensing circuitry) and allow a page of memory cells to be read or programmed in parallel. In certain embodiments, each memory cell across a row of the memory array together form a physical page.

A physical page may include memory cells along a row of the memory array for a single plane or for a single memory die. In one embodiment, the memory die includes a memory array made up of two equal sized planes. A plane is a division of the memory array that permits certain storage operations to be performed on both places using certain physical row addresses and certain physical column addresses. In one embodiment, a physical page of one plane of a memory die includes four data blocks (e.g., 16 KB). In one embodiment, a physical page (also called a "die page") of a memory die includes two planes each having four data blocks (e.g., 32 KB).

Commands and data are transferred between the host device 108 and storage controller 104 via a data bus 222, and between the storage controller 104 and the one or more memory die 106 via bus 220. The storage controller 104 may comprise the logical modules described in more detail with respect to FIG. 5.

The non-volatile memory array 206 can be two-dimensional (2D—laid out in a single fabrication plane) or three-dimensional (3D—laid out in multiple fabrication planes). The non-volatile memory array 206 may comprise one or more arrays of memory cells including a 3D array. In one embodiment, the non-volatile memory array 206 may comprise a monolithic three-dimensional memory structure (3D array) in which multiple memory levels are formed above (and not in) a single substrate, such as a wafer, with no intervening substrates. The non-volatile memory array 206 may comprise any type of non-volatile memory that is monolithically formed in one or more physical levels of arrays of memory cells having an active area disposed above a silicon substrate. The non-volatile memory array 206 may be in a non-volatile solid state drive having circuitry associated with the operation of the memory cells, whether the associated circuitry is above or within the substrate. Word lines may comprise sections of the layers containing memory cells, disposed in layers above the substrate. Multiple word lines may be formed on single layer by means of trenches or other non-conductive isolating features.

The die controller 204 cooperates with the read/write circuits 208 to perform memory operations on memory cells of the non-volatile memory array 206, and includes a state machine 214, an address decoder 216, and a power control 218. The state machine 214 provides chip-level control of memory operations.

The address decoder 216 provides an address interface between that used by the host or a storage controller 104 to the hardware address used by the row decoder 210 and column decoder 212. The power control 218 controls the power and voltages supplied to the various control lines during memory operations. The power control 218 and/or read/write circuits 208 can include drivers for word lines, source gate select (SGS) transistors, drain gate select (DGS) transistors, bit lines, substrates (in 2D memory structures), charge pumps, and source lines. In certain embodiments, the power control 218 may detect a sudden loss of power and take precautionary actions. The power control 218 may include various first voltage generators (e.g., the drivers) to generate the voltages described herein. The sense blocks can include bit line drivers and sense amplifiers in one approach.

In some implementations, some of the components can be combined. In various designs, one or more of the components (alone or in combination), other than non-volatile memory array 206, can be thought of as at least one control circuit or storage controller which is configured to perform the techniques described herein. For example, a control circuit may include any one of, or a combination of, die controller 204, state machine 214, address decoder 216, column decoder 212, power control 218, control processor 512, error correction unit 514, sense blocks SB1, SB2, . . . , SBp, read/write circuits 208, storage controller 104, and so forth.

In one embodiment, the host device 108 is a computing device (e.g., laptop, desktop, smartphone, tablet, digital camera) that includes one or more processors, one or more processor readable storage devices (RAM, ROM, flash memory, hard disk drive, solid state memory) that store processor readable code (e.g., software) for programming the storage controller 104 to perform the methods described herein. The host may also include additional system memory, one or more input/output interfaces and/or one or more input/output devices in communication with the one or more processors, as well as other components well known in the art.

Associated circuitry is typically required for operation of the memory cells and for communication with the memory cells. As non-limiting examples, memory devices may have circuitry used for controlling and driving memory cells to accomplish functions such as programming and reading. This associated circuitry may be on the same substrate as the memory cells and/or on a separate substrate. For example, a storage controller for memory read-write operations may be located on a separate storage controller chip and/or on the same substrate as the memory cells.

One of skill in the art will recognize that the disclosed techniques and devices are not limited to the two-dimensional and three-dimensional exemplary structures described but covers all relevant memory structures within the spirit and scope of the technology as described herein and as understood by one of skill in the art.

Figure 3:
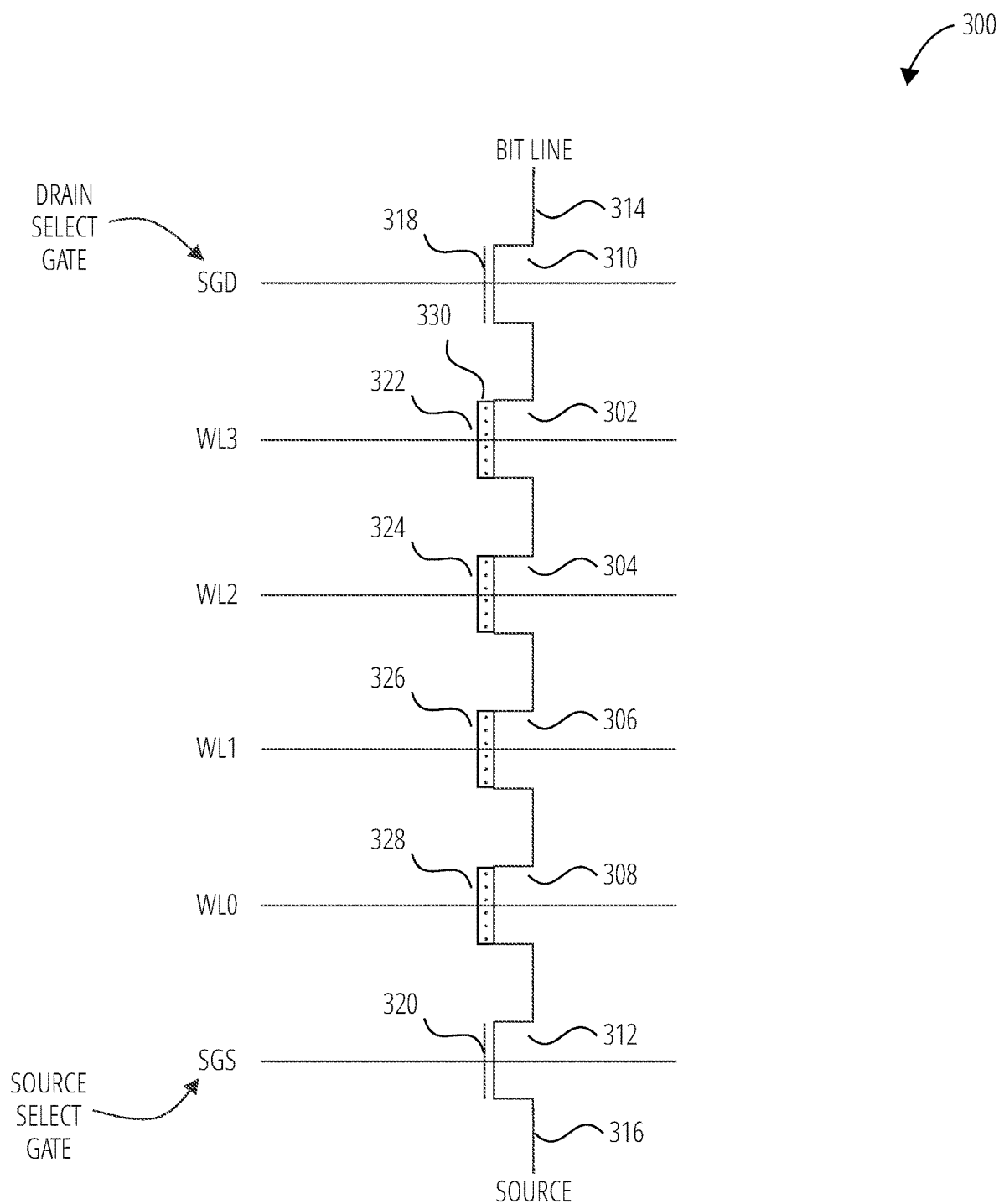
FIG. 3 is a schematic block diagram illustrating one embodiment of a NAND string 300.

FIG. 3 depicts one embodiment of a NAND string 300 comprising a plurality of memory cells. The NAND string 300 depicted in FIG. 3, in some embodiments, includes four transistors (transistor 302, transistor 304, transistor 306, and transistor 308) connected in series and located between a first select transistor 310 and a second select transistor 312. In some embodiments, the transistor 302, transistor 304, transistor 306, and transistor 308 each include a control gate with a charge trap layer 330. Control gate 322, control gate 324, control gate 326, and control gate 328, in one embodiment, are connected to, or comprise a portion of, a word line. In a further embodiment, transistor 302, transistor 304, transistor 306, and transistor 308 are memory cells, storage elements, or the like, also referred to herein as memory cells. In some embodiments, a single memory cell may include multiple transistors.

The first select transistor 310, in some embodiments, gates/connects the NAND string 300 to a bit line 314 via a drain select gate/select gate drain (SGD). The second select transistor 312, in certain embodiments, gates/connects the NAND string 300 to a source line 316 via a source select gate/select gate source (SGS). The first select transistor 310, in a further embodiment, is controlled by applying a voltage to a corresponding select gate 318. The second select transistor 312, in some embodiments, is controlled by applying a voltage to corresponding select gate 320.

As shown in FIG. 3, the source line 316, in one embodiment, is connected to the source lead of each transistor/memory cell in the NAND string 300. The NAND string 300, in some embodiments, may include some memory cells that have been programmed and some memory cells that have not been programmed.

Figure 4:
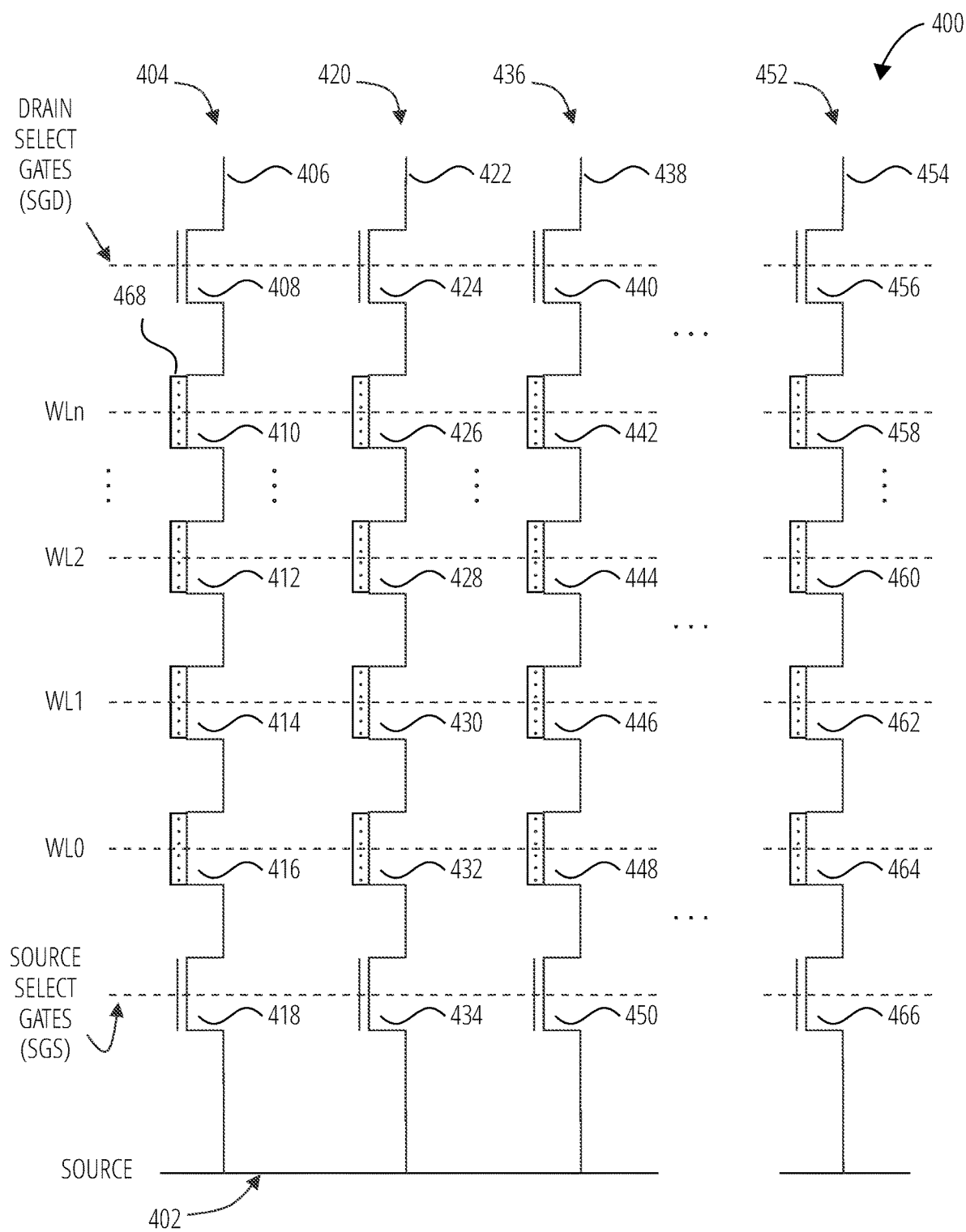
FIG. 4 is a schematic block diagram illustrating one embodiment of a memory array 400.

FIG. 4 is a circuit diagram depicting a memory array 400 comprising a plurality of NAND strings. An architecture for a memory array using a NAND structure may include a significant number of NAND strings. For example, FIG. 4 illustrates a memory array 400 that includes NAND string 404, NAND string 420, NAND string 436, and NAND string 452. In the depicted embodiment, each NAND string includes drain select transistors (select transistor 408, select transistor 424, select transistor 440, and select transistor 456), source select transistors (select transistor 418, select transistor 434, select transistor 450, select transistor 466), and memory cells (410, 412, 414, 416, 426, 428, 430, 432, 442, 444, 446, 448, 458, 460, 462, 464). The memory cells may be transistors that incorporate a charge trap layer 468. While four memory cells per NAND string are illustrated for simplicity, some NAND strings can include any number of memory cells, e.g., thirty-two, sixty-four, or the like memory cells.

NAND string 404, NAND string 420, NAND string 436, and NAND string 452, in one embodiment, are connected to a source line 402 by source select transistor 418, select transistor 434, select transistor 450, and select transistor 466, respectively. A source select line SGS may be used to control the source side select transistors, 418, 434, 450,466. The various NAND strings, in one embodiment, are connected to bit line 406, bit line 422, bit line 438, and bit line 454 by drain select transistor 408, select transistor 424, select transistor 440, and select transistor 456, respectively, as shown. The drain select transistors may be controlled by a drain select line SGD. In some embodiments, the select lines do not necessarily need to be in common among the NAND strings; that is, different select lines can be provided for different NAND strings.

As described above, each word line WL0-WLn comprises one or more memory cells. In the depicted embodiment, each of bit line 406, bit line 422, bit line 438, and bit line 454, and the respective NAND string 404, NAND string 420, NAND string 436, and NAND string 452, comprise the columns of the memory array 400, storage block, erase block, or the like. These columns may also be referred to as channels. The word lines WL0-WLn, in some embodiments, comprise the rows of the memory array 400, storage block, erase block, or the like. Each word line WL0-WLn, in some embodiments, connects the control gates of each memory cell in a row. Alternatively, the control gates may be provided by the word lines WL0-WLn themselves. In some embodiments, a word line WL0-WLn may include tens, hundreds, thousands, millions, or the like of memory cells.

In one embodiment, each memory cell is configured to store data. For example, when storing one bit of digital data, the range of possible threshold voltages ("VTH") of each memory cell may be divided into two ranges which are assigned logical data "1" and "0." As used herein, threshold voltage refers to a magnitude of voltage applied to the gate of a memory cell sufficient to cause the memory cell to activate. In embodiments, in which the memory cell is a NAND transistor, the threshold voltage is a sufficient voltage applied to a gate terminal of the transistor that causes the transistor to conduct current between its source terminal and drain terminal. In one example of a NAND type flash memory, the VTH may be negative after the memory cells are erased, and defined as logic "1." In one embodiment, the VTH after a program operation is positive and defined as logic "0."

When the VTH is negative and a read is attempted, in some embodiments, memory cells will turn on to indicate logic "1" is being stored. When the VTH is positive and a read operation is attempted, in a further embodiment, a memory cell will not turn on, which indicates that logic "0" is stored. Each memory cell may also store multiple levels of information, for example, multiple bits of digital data. In such an embodiment, the range of VTH value is divided into the number of levels of data. For example, if four levels of information can be stored in each memory cell, there will be four VTH ranges assigned to the data values "11", "10", "01", and "00."

In one example of a NAND type memory, the VTH after an erase operation may be negative and defined as "11." Positive VTH values may be used for the states of "10", "01", and "00." In one embodiment, the specific relationship between the data programmed into the memory cells and the threshold voltage ranges of the memory cells depends upon the data encoding scheme adopted for the memory cells.

Figure 5:
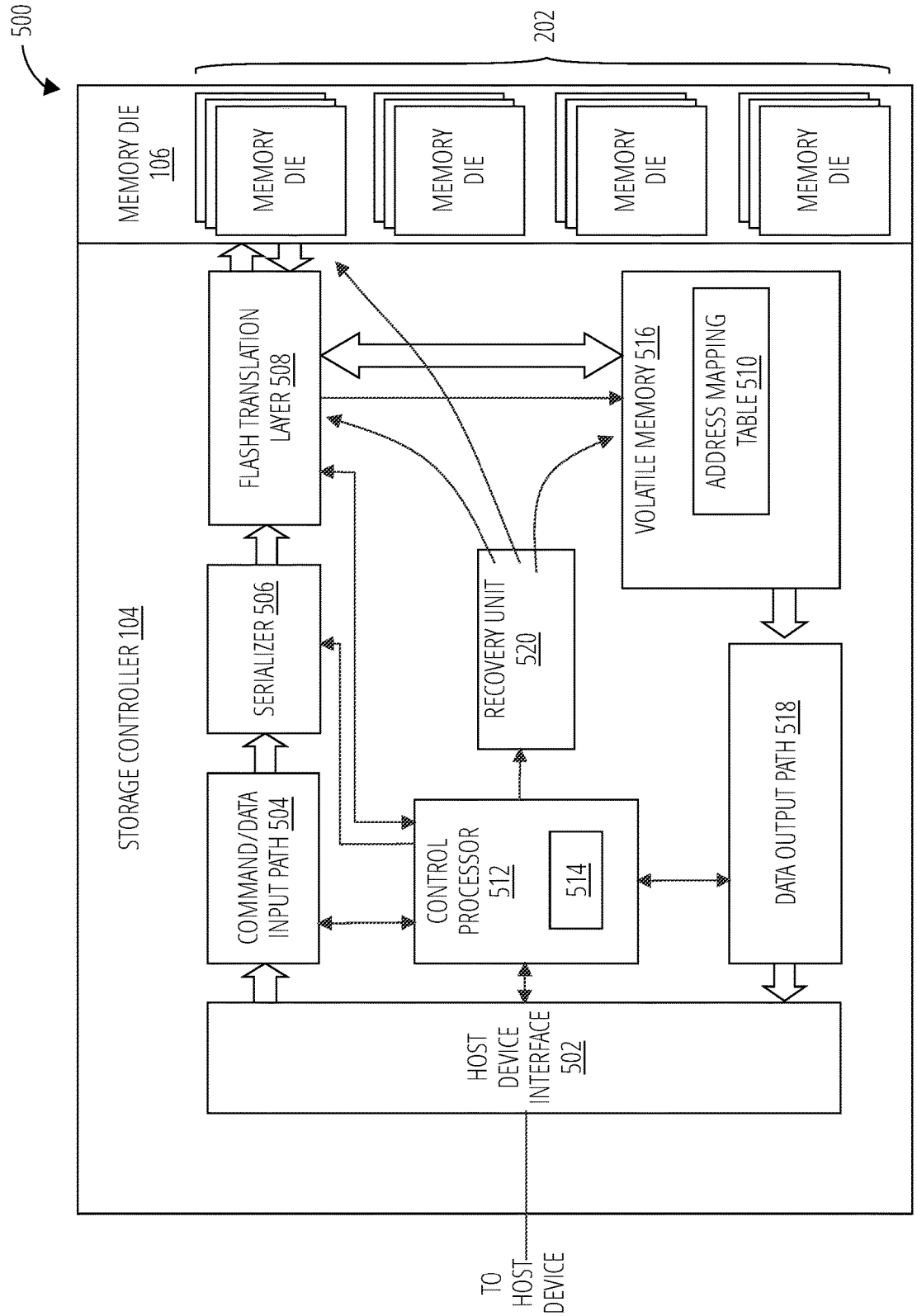
FIG. 5 illustrates a memory device 500 in accordance with one embodiment.

Referring to FIG. 5, a memory device 500 comprises a storage controller 104 and memory die 106. The storage controller 104 manages the memory die 106, and may comprise various hardware and software controllers, drivers, and software, including a host device interface 502, a command/data input path 504, a serializer 506, a FLASH translation layer 508, an address mapping table 510, a control processor 512, volatile memory 516, and a data output path 518. The memory die 106 includes a memory array 202.

Figure 6:
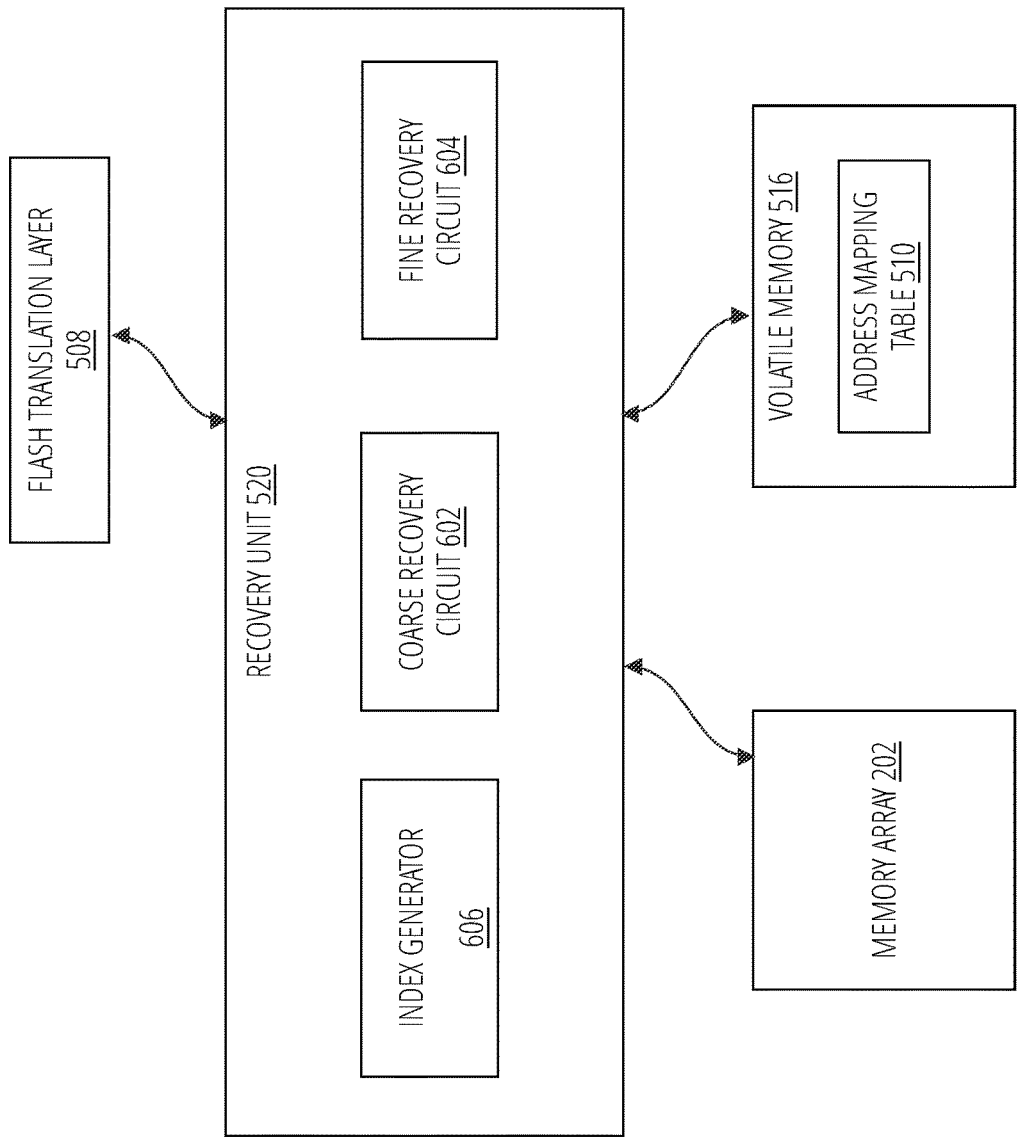
FIG. 6 illustrates a recovery unit 520 in accordance with one embodiment.

The memory device 500 may also include a recovery unit 520, which implements the method disclosed herein and is described in more detail with respect to FIG. 6.

As described above, certain storage devices, while appearing to a storage client 112 (or host device) to be a block storage device, do not directly associate particular logical addresses with particular physical data blocks, also referred to in the art as sectors. Such storage devices may use an address mapping table 510. The address mapping table 510 provides a level of abstraction between the logical addresses used by the storage client 112, and the physical addresses at which the storage controller 104 stores the data. The address mapping table 510 maps logical addresses to physical addresses of data blocks stored on memory die 106. This mapping allows data to be referenced in a logical address space using a logical identifier, such as a logical block address. A logical identifier does not indicate the physical location of data on the memory die 106, but is an abstract reference to the data.

The storage controller 104 manages the physical addresses in the physical address space. In one example, contiguous logical addresses may in fact be stored in non-contiguous physical addresses as the address mapping table 510 tracks and identifies the proper physical location within the memory die 106 to perform data operations.

Furthermore, in certain embodiments, the logical address space may be substantially larger than the physical address space. This "thinly provisioned" or "sparse address space" embodiment, allows the number of logical identifiers for data references to greatly exceed the number of possible physical addresses.

In one embodiment, the address mapping table 510 includes a map or index that maps logical addresses to physical addresses. The map may be in the form of a B-tree, a content addressable memory ("CAM"), a binary tree, and/or a hash table, and the like. In certain embodiments, the address mapping table 510 is a tree with nodes that represent logical addresses and comprise corresponding physical addresses.

The storage controller 104 preserves the relationship between the logical address and a physical address of the data on the storage device corresponding to the physical data block. As the number of allocated data blocks, stored/written data blocks increases, the performance of the storage controller 104 may suffer depending on the configuration of the storage controller 104. Specifically, in certain embodiments, the storage controller 104 is configured to store data sequentially and use a storage space recovery process that re-uses memory cells storing deallocated/unused data blocks. Specifically, the storage controller 104 may sequentially write data on the memory die 106 within one or more physical structures of the memory cells, the data is sequentially stored on the memory die 106.

As a result of storing data sequentially, the storage controller 104 achieves a high write throughput and a high number of I/O operations per second ("TOPS"). The storage controller 104 includes a storage space recovery, or garbage collection process that re-uses data memory cells to provide sufficient storage capacity. The storage space recovery process reuses memory cells for data blocks marked as deallocated, invalid, unused, or otherwise designated as available for storage space recovery in the address mapping table 510.

The host device interface 502 may be configured by the command/data input path 504 regarding delays in sending and reporting sent and received data and commands. The host device interface 502 further sends incoming storage commands and data for processing to the command/data input path 504. The command/data input path 504 receives data for processing from the host device interface 502. The data is then sent to a serializer 506. The command/data input path 504 further sends control signals regarding workload to the control processor 512. The workload attributes may include a percentage of read storage commands received, a percentage of write storage commands received, a queue depth, a percentage of storage commands directed at non-contiguous or random addresses, an average transfer length for data associated with a storage command, an initiator count, a port count, measure of input/outputs per second (IOPS), and the like.

The serializer 506 receives the data from the command/data input path 504. The serializer 506 performs the process of translating data structures, such as data packers, or object state, into a format that can be stored (for example, in a file or memory buffer). The serializer 506 may be managed by a control signal. Such a control signal may influence a FLASH translation layer queue depth. The processed data is then sent to the FLASH translation layer 508. In some embodiments, the processed data alters the FLASH translation layer queue depth of the FLASH translation layer 508, altering the number of commands the FLASH translation layer 508 is concurrently processing.

The FLASH translation layer 508 receives the processed data as well as one or more control signals to determine the FLASH translation layer queue depth. The FLASH translation layer 508 may interact via control signals with the address mapping table 510 to determine an appropriate physical address to send data and commands to the memory die 106 and the volatile memory 516. In one embodiment, the FLASH translation layer 508 also receives the data outputs from the memory die 106.

The memory die 106 performs the storage operation (read, write, erase) and returns data output, if the storage command has output data.

The address mapping table 510 stores address locations for data blocks on the memory device 500 to be utilized by the FLASH translation layer 508. Specifically, the FLASH translation layer searches the address mapping table 510 to determine if a logical block address included in the storage command, has an entry in the address mapping table 510. If so, the physical address associated with the logical block address is used to direct the storage operation on the memory die 106.

In the illustrated embodiment, the memory cells of the memory die are asymmetric, write-once storage media. Consequently, each write operation to the memory cells requires a new physical address to be assigned to the logical block address for the data. Generally, the logical block address remains the same and the physical address changes so that the storage controller 104 can quickly service a write storage command.

In one embodiment, the address mapping table 510, or a portion thereof, is stored in the volatile memory 516. The FLASH translation layer 508 references the address mapping table 510 frequently to service read commands and updates the address mapping table 510 to track new physical addresses for each write command (both a new write with a new logical block address and an write that updates the data for a previously assigned logical block address). As a result, the state and contents of the address mapping table 510 may change frequently and regularly.

Those of skill in the art will appreciate that the entire address mapping table 510 may be too large to fit at one time in the volatile memory 516. Consequently, for such embodiments, rather than loading the whole address mapping table 510 into volatile memory 516, cache management logic and cache entries may be loaded into the volatile memory 516. For such embodiments, a master flush means that any modified address mapping table entries in the volatile memory 516 are flushed, or stored, to the memory die 106. Those of skill in the art understand that were a complete copy of the address mapping table in volatile memory are discussed, a set of mapping table cache entries and mapping table cache logic may be used in place of the complete copy in volatile memory.

The storage controller 104 writes data to the memory die 106 with certain metadata. The metadata may include the logical block address for each data blocks, or set of data blocks and an indicator as to how many data blocks are associated with the logical block address. Data blocks are written sequentially on the memory die 106. Consequently, the storage controller 104 can read each data block on the memory die 106 and re-create the address mapping table 510, if necessary.

Ideally, the storage controller 104 manages the address mapping table 510 such that reading each of the data blocks stored in the memory array 202 is not necessary to restore the address mapping table 510. The series of steps and operations that the storage controller 104 performs to get to an operational state after a shutdown event (graceful or ungraceful) is referred to herein as an initialization operation.

Generally, to minimize the time required for an initialization operation, the storage controller 104 periodically stores a complete copy of the address mapping table 510 to the memory die 106. In embodiments with an address mapping table 510 that does not fit in volatile memory 516, the storage controller 104 periodically stores modified portions of the address mapping table 510 that are in volatile memory to the memory die 106.

In certain embodiments, the storage controller 104 stores the modified portions of the address mapping table 510 to the memory die 106 during a graceful shutdown event. In embodiments with an address mapping table 510 that does not fit in volatile memory 516, the storage controller 104 stores modified portions of the address mapping table 510 that are in volatile memory to the memory die 106 during a graceful shutdown event. When the storage controller 104 powers up again after the graceful shutdown event, the storage controller 104 loads the complete address mapping table 510 into volatile memory 516 as part of the initialization process. In embodiments with an address mapping table 510 that does not fit in volatile memory 516, the storage controller 104 loads a predetermined set of portions of the address mapping table 510 into volatile memory 516 as part of the initialization process. There are no further steps needed for the storage controller 104 to get the address mapping table 510 (or portions of the address mapping table 510 in volatile memory 516) to a state prior to the graceful shutdown.

If the storage controller 104 experiences an ungraceful shutdown event and the storage controller 104 has periodically stored a complete copy of the address mapping table 510, the storage controller 104 loads the last known complete copy of the address mapping table 510 from the memory array (e.g., memory die). Next, the storage controller 104 reads each data block stored between when the last known complete copy of the address mapping table 510 was stored and the ungraceful shutdown event happened. From each data block read during this initialization operation process, the storage controller 104 updates the newly loaded address mapping table 510 with physical address changes that are recorded in the data blocks that are read. Once all the data blocks are read, and the address mapping table 510 updated, the address mapping table 510 reflects its state prior to the ungraceful shutdown event. The initialization operation then completes and the storage controller 104 can begin servicing storage clients.

The recovery unit 520 coordinates with the FLASH translation layer 508 and the address mapping table 510 to manage the time needed to recover the original state of the address mapping table 510 prior to an ungraceful shutdown event. In certain embodiments, the recovery unit 520 is configured to enable the storage controller 104 and/or a user and/or a storage client 112 to tune and configure the storage controller 104 to set the recovery time for an initialization operation such that the initialization operation meets a timing metric.

The timing metric is a maximum time, a time range, or other designation of time that defines how long the initialization operation should take. The timing metric may be set forth in an industry standard performance specification. For certain memory devices, the timing metric may be measured in 10s of microseconds, 100s of milliseconds, 1-2 seconds, a minute, or the like.

Advantageously, the recovery unit 520 enables a manufacturer, storage client 112, or storage controller 104 to define the parameter for the timing metric and the recovery unit 520 will work with the FLASH translation layer 508, the address mapping table 510, and the memory array 202 to meet the timing metric.

In one embodiment, the recovery unit 520 uses at least two techniques for deterministically managing the initialization operation time. First, the recovery unit 520 manages how often the storage controller 104 performs a master flush of the address mapping table 510. Flushing the address mapping table 510 is a maintenance operations that may impact the level of performance the storage controller 104 gives to the storage clients. This potential performance cost incentivizes the recovery unit 520 to do a master flush as infrequently as possible. However, the more often the recovery unit 520 does a master flush the smaller the amount of data blocks that may be written to the memory array 202 and would need to be read to rebuild/restore the address mapping table 510 to its state prior to an ungraceful shutdown event.

Second, the recovery unit 520 manages how information that tracks a relationship between logical block addresses and physical addresses is stored on the memory array for data blocks written between completion of a master flush. The relationship logical block addresses and physical addresses is a one to one relationship, each logical block address has only one physical address in the memory array 202. This relationship is also referred to as a logical to physical mapping, abbreviated L2P. The information that tracks a relationship between logical block addresses and physical addresses is called an index or a mapping. As used herein, an index contains information from which logical block addresses and corresponding physical addresses for a plurality of data blocks can be determined. As a result, when re-building an address mapping table 510, the storage controller 104 need only read the one index to determine logical block addresses and corresponding physical addresses for a plurality of data blocks represented by the one index. In one embodiment, an index may comprise the logical identifiers (e.g., logical block addresses) of each of the data blocks that the index represents. In addition to the identifier information describing logical identifiers (e.g., logical block addresses), an index may, in some embodiments, also include location information describing physical storage locations (e.g., physical addresses) on memory die(s) where the data blocks represented by the index are located. In one embodiment, the location information represents a physical storage location without explicitly comprising the physical storage location. In one example, the index may include an offset for one or more of the data blocks index represents where the offset is an offset from a physical location in which the index is stored. In another example, the location information may be an offset within a logical erase block or an offset within a logical page. In another embodiment, the location information comprises a count and an offset and a physical storage location is derived by knowing the number of data blocks represented by an index and multiplying that by the size of the data blocks where the data blocks are of a known fixed size. This information together with the ordering of index entries in an index may permit derivation of the physical storage location. An index may be organized into any suitable data structure. Examples, of possible index data structures include, but are not limited to, a key-value pair, a linked list, starting logical block address and a starting physical address and a count indicating how many sequentially addressed data blocks are associated with this starting logical block address and starting physical address, and the like.

By managing the frequency of the master flush and how mapping or index data is stored on the memory array 202, the storage controller 104 manages the time needed for an initialization operation.

The volatile memory 516 may send and receive data (processed data, data outputs, etc.) from the FLASH translation layer 508 and the data output path 518. The volatile memory 516 is a region of a physical memory storage used to temporarily store data while it is being moved from one place to another. For example, the volatile memory 516 may store processed data that is not actively queued in the FLASH translation layer 508 and send further processed data upon request by the FLASH translation layer 508. The FLASH translation layer 508 may perform a similar process for data outputs for the data output path 518.

The data output path 518 determines the scheduling of host device data transfers (e.g., of data outputs) and the scheduling of host device responses. The data output path 518 communicates with the host device interface 502 to send and receive this data and commands. The scheduling of the host device data transfers and the host device responses may be influenced by control signals. The data output path 518 may be altered by the control signals to delay the data transfers or the response frames. The data output path 518 further sends control signals regarding workload to the control processor 512. The workload attributes may include percentage read, a queue depth, a percentage random, a transfer length, an initiator count, a port count, and input/outputs per second (IOPS).

FIG. 6 illustrates a recovery unit 520 in more detail in accordance with one embodiment. The recovery unit 520 includes an index generator 606, coarse recovery circuit 602, and fine recovery circuit 604. the recovery unit 520 interacts with the FLASH translation layer 508, address mapping table 510 in volatile memory 516, and the memory array 202.

In one embodiment, the memory array 202 includes a plurality of memory dies. Each memory die may include two physical planes. Each physical plane may include a plurality of physical erase blocks and each physical erase block may include a set of word lines that each include non-volatile memory cells. As described in more detail below, a physical erase block from each memory die may be organized into a logical erase block. In one embodiment, the logical erase block includes a physical erase block from the same row of a non-volatile memory array within each memory die. A logical erase block enables the storage controller to read and write large quantities of data in a few storage operations.

The coarse recovery circuit 602 manages storing a copy of the address mapping table 510 residing in volatile memory 516 to the memory array 202 (e.g., the master flush). In one embodiment, the coarse recovery circuit 602 stores a copy of the address mapping table 510 to the memory array 202 according to a predefined schedule. The predefined schedule may be defined based on a time schedule or a set amount of data blocks having been written or a set amount of storage operations having been completed by the storage controller 104. The coarse recovery circuit 602 may communicate with the storage controller 104 to gather information about an elapsed time period, a number of data blocks that have been written, or a number of storage operations having been completed in order to determine when to do the next master flush and still satisfy the predefined schedule.

In one embodiment, the coarse recovery circuit 602 retrieves a stored copy of the address mapping table 510 from the memory array 202 during an initialization operation. The coarse recovery circuit 602 may also load the address mapping table 510 into volatile memory 516.

The fine recovery circuit 604 coordinates with the index generator 606 to generate and store one or more indexes within the memory array 202. In one embodiment, the fine recovery circuit 604 stores the one or more indexes in such a manner that optimizes how many indexes can be read from the memory array 202 in a single read operation. In another embodiment, the fine recovery circuit 604 stores the one or more indexes in such a manner that optimizes whether an index can be read from the memory array 202 with a fewest number of errors. In another embodiment, the fine recovery circuit 604 stores the one or more indexes in a manner that groups a plurality of indexes within a single data block on the memory array 202.

The index generator 606 generates an index. In one embodiment, the fine recovery circuit 604 tracks the logical block addresses for data blocks that are stored since an index is written to the memory array 202. The fine recovery circuit 604 provides this set of logical block addresses and information about where those data blocks are physically stored on the memory array 202 to the index generator 606 so that the index generator 606 can generate an accurate index. As described above, the format, nature and organization of the index may vary in different embodiments.

The index generator 606 builds an index containing information from which the logical block addresses of the data blocks and the corresponding physical addresses may be determined. In one embodiment, index generator 606 stores the index to the memory array 202. Each index may contain information from which the logical block addresses of certain data blocks written earlier to the memory array 202 may be determined. In one embodiment, an index may include the logical block addresses of each data block that the index represents. In another embodiment, an index may include a single logical block address of one data block and the fine recovery circuit 604 may derive the logical block address for the other data blocks that the index represents.

In one embodiment, after the storage controller 104 stores data blocks to a predetermined number of logical word lines of a logical erase block, the fine recovery circuit 604 stores a first index on a first plane of a pair of planes of a subsequent word line of the logical erase block. Next, after the storage controller 104 stores data blocks to another predetermined number of logical word lines, the fine recovery circuit 604 stores a second index on a second plane of the pair of planes of another subsequent logical word line. In this embodiment, the fine recovery circuit 604 strategically places the first index and second index on different planes of different word lines of the memory die such that both the first index and the second index may be read in a single read operation. Accordingly, this single read operation speeds up the reading of the indexes which enables the fine recovery circuit 604 to perform recovery of the address mapping table 510 within a desired timing metric.

As used herein, a "physical" structure such as a physical page, physical word line, physical erase block, physical plane, physical memory die, or the like, refers to a single physical structure that a controller, manager, module, or other logic component of the system can control and/or communicate with at some level within one or more levels of physical abstraction in the organization of the system or apparatus. Similarly, a "logical" structure such as a logical page, logical word line, logical erase block, logical plane, logical memory die, or the like, refers to a collection of two or more single physical structures of that same type that a controller, manager, module, or other logic component of the system can control and/or communicate with at some level within one or more levels of physical abstraction in the organization of the system or apparatus. It should be noted that one or the other or both a "physical" structure and a "logical" structure may have distinct addresses that can be used to identify one "physical" structure or "logical" structure relative to other structures of a similar nature and type.

Figure 7:
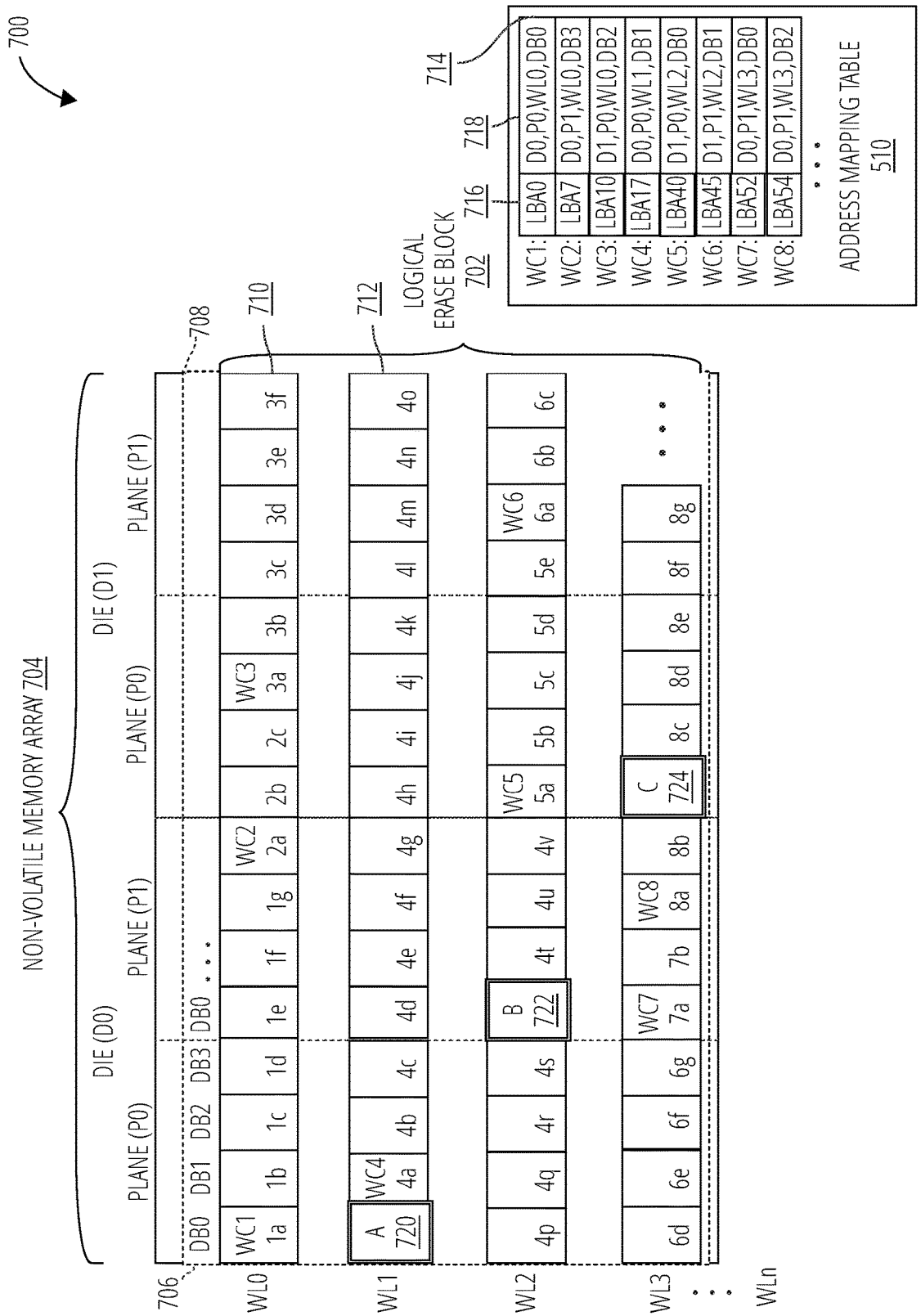
FIG. 7 illustrates a layout for data blocks and indexes 700 in accordance with one embodiment.

FIG. 7 illustrates a layout for data blocks and indexes 700 in accordance with one embodiment. In FIG. 7, an example embodiment is shown using fewer elements and components for simplicity and clarity than may be used in a produced product.

An embodiment of a logical erase block 702 in a non-volatile memory array 704 is shown comprising two memory dies, each having a plane 0 and a plane 1. Each plane of each memory die includes a plurality of word lines. Word lines that span planes and word lines that span memory die may be referred to as logical word lines (e.g., 710, 712) interchangeably herein. In the example embodiment, shown in FIG. 7, the logical word lines are indicated by WL0, WL1, WL2, WL3, etc. In the depicted embodiment, a storage controller writes data to logical word lines in a predefined order. In the illustrated embodiment, the first data block (DB) written to the logical erase block 702 is written to WL0 (specifically memory die 0, plane 0, a column DB0. The second data block is the next available data block, DB1 in WL0, on plane 0, of memory die 0. This write order progresses until all data blocks of logical word line WL0 are written, then the storage controller writes the next data block on WL1 which is known as the next word line or may be referred to as a subsequent word line. As used herein, a subsequent word line is any word line (logical or physical) that the storage controller is prepared to write data blocks to after the storage controller finishes writing data blocks to a current word line according to a write order or write order method of the storage controller. It should be noted that the next word line and subsequent word line may not be the same word line. In the illustrated embodiment, WL1 is the next word line because it is the next word line to receive data blocks and WL1 is a subsequent word line because WL1 follows WL0 in the write order. However, while WL1 is the next word line after WL0; WL1, WL2, or WL3 are each subsequent word line because they are later in the write order following writing to WL0. This same relationship among word line may exist for logical word lines. Namely, WL1 is the next logical word line because WL1 is the next logical word line to receive data blocks and WL1 is a subsequent logical word line because WL1 follows WL0 in the write order. However, while WL1 is the next logical word line after WL0; WL1, WL2, or WL3 are each subsequent logical word line because they are later in the write order following writing to WL0.

The logical erase block 702 is made up of one physical erase block (PEB) (e.g., PEB 706 and PEB 708) from each memory die in the non-volatile memory array 206. In certain embodiments, the PEBs used to form the logical erase block 702 are in the same row of the non-volatile memory array 704 however other embodiments may use a PEB from a different row in one or more of the memory die of the non-volatile memory array 704.

Four of the logical word lines making up the logical erase block 702 are shown, divided into 16 data blocks (DBs) each. In this embodiment, a host device 108 may have issued 8 write commands (WCs). The host device 108 has accordingly written the data in those 8 commands to logical erase block 702 on physical memory, beginning in the DBs labeled "WC1," "WC2," and so on. Note that while these are shown as being physically concurrent in this example, for the sake of simplicity, it is not necessary for the method disclosed that data from consecutive write commands be physically proximate.

For each write command ("WCn"), a logical block address is assigned such that the host device 108 may reference the data without tracking physical addresses used by the memory device 102. The address mapping table 510 records a relationship 714 between logical block addresses 716 (LBAs) and physical addresses 718 in volatile memory, as shown.

In this embodiment, data from WC1 uses 7 data blocks of space on WL0. WC2 data uses 3 data blocks, and WC3 uses 6 data blocks. When the number of logical word lines written and/or the number of data blocks written satisfy a predetermined number of logical word line (or physical word lines) and/or a predetermined number of data blocks, the fine recovery circuit 604 generates an index and stores the index on the non-volatile memory array 704.

The recovery unit 520 may use a variety of criteria to define when the fine recovery circuit 604 will generate an index and store the index on the non-volatile memory array 704. In one embodiment, the recovery unit 520 tracks how many data blocks that have been written since a last master flush and/or index was written. When the number of data blocks reaches a predetermined number, such as 4, 8, 12, 16, 32, etc., the recovery unit 520 generates an index and stores the index on the non-volatile memory array 704. Such a predetermined number of data blocks is referred to herein as a flush threshold.

In another embodiment, the recovery unit 520 tracks how many word lines and/or logical word lines that have been written since a last master flush and/or index was written. When the number of word lines and/or logical word lines reaches a predetermined number, such as 1, 4, 8, 12, 16, 32, etc., the recovery unit 520 generates an index and stores the index on the non-volatile memory array 704. Such a predetermined number of word lines and/or logical word lines is referred to herein as a flush threshold (also referred to as a flush distance, described more below).

In the illustrated embodiment of FIG. 7, the flush threshold is once every logical word line. Accordingly, the fine recovery circuit 604 stores index A 720 on subsequent logical word line 712. Subsequent word line 712 is a subsequent word line to the logical word line 710 that the storage controller last wrote data blocks to. Index A 720 includes information for identifying the logical block address for each of the 16 data blocks DBs stored on WL0. In this example, three indexes are written to the non-volatile memory array 206 (index A 720, index B 722, and index C 724). index A 720 may be referred to as a first index. Index B 722 may be referred to as a second index.

In this example, index A 720 stores mapping address information associated with WC1, WC2, and WC3. Specifically, index A 720 stores mapping address information for data in DBs 1a-3f (16 DBs, 3 write commands). Should an ungraceful shutdown event occur, and should corresponding entries in the address mapping table 510 be lost, the recovery unit 520 reads index A 720 to rebuild the address mapping table 510 during an initialization operation.

In one embodiment, the fine recovery circuit 604 is configured to store an index in any of the data block columns (DB0, DB1, DB2, DB3) of any plane of any memory die of the non-volatile memory. This means that the fine recovery circuit 604 may store an index in between data blocks associated with a given write command. Alternatively, the fine recovery circuit 604 may store an index at a predefined location within a plane of a logical word line. In FIG. 7, index A 720, index B 722, and index C 724, for example, are each in the first data block position of a plane within the logical word line.

In certain embodiments, the fine recovery circuit 604 is configured to store an index in data block columns (DB0, DB1, DB2, DB3) such that no more than one read operation is required to read in the data for all indexes on the non-volatile memory array 704. This means that each column of a logical erase block 702 would include only one index. In the depicted example, the first index, index A 720 is stored on logical word line WL1 and the second index, index B 722 is stored on logical word line WL2 (also referred to as the another subsequent logical word line). Alternatively, the fine recovery circuit 604 may store the first index, index A 720 stored on logical word line WL1 and the second index, index B 722 on the same logical word line WL1 (also referred to as the subsequent logical word line).

As is shown in FIG. 7, a write command for a large amount of data may store DBs across multiple logical word lines. In one embodiment, the fine recovery circuit 604 may store index B 722 in logical word line WL2, Die0, plane1, and DB0 to facilitate reading index B 722. As illustrated, index B 722 divides up the 19 DBs of WC4. In such an instance, index B 722 may include logical to physical addressing information for all data blocks of a single write command. The fine recovery circuit 604 may derive logical block address and physical address information for data blocks written after index B 722. Alternatively, in a case where the data written spans 22 logical word lines, as shown by WC4, index B 722 may contain the addressing information for a single write command, and some of the DBs taken by that write command may have their addressing information stored in a subsequent index, namely, index C 724. In this example, index B 722 stores mapping address information associated with WC4. Specifically, index B 722 stores mapping address information for data in DBs 4a-4v (22 DBs, 1 write command). In this example, index C 724 stores mapping address information associated with WC5 and WC6. Specifically, index C 724 stores mapping address information for data in DBs 5a-8g (21 DBs, 4 write commands).

Note that while a DB on each logical word line may be set aside for an index, the remainder of that logical word line is free for user data. In some embodiments, if the size of an index is less than the 4 KB of the DB, the DB may be padded out, and user data only written on a subsequent DB. However, in other embodiments, an index and a portion of user data may share a single DB. In this case, the user data from there on, may have unaligned accesses, and some memory configurations may not be optimally designed for such accesses, so such designs may avoid sharing a DB between an index and user data. However, architectures having FLASH translation layer (FTL) granularity at a sector level may not have difficulty with such sharing, since they may use a data block size of one sector (e.g., 512 bytes).

In some embodiments, an index may be saved at a write command level, instead of an DB level. In such a case, addressing information for long sequential writes may be compacted compared to the information needed to reconstruct numerous random writes. In such an case, index B 722 may only store a small amount of data pertinent to WC4, whereas index C 724 may store data for WC5, WC6, WC7, and WC8.

Figure 8:
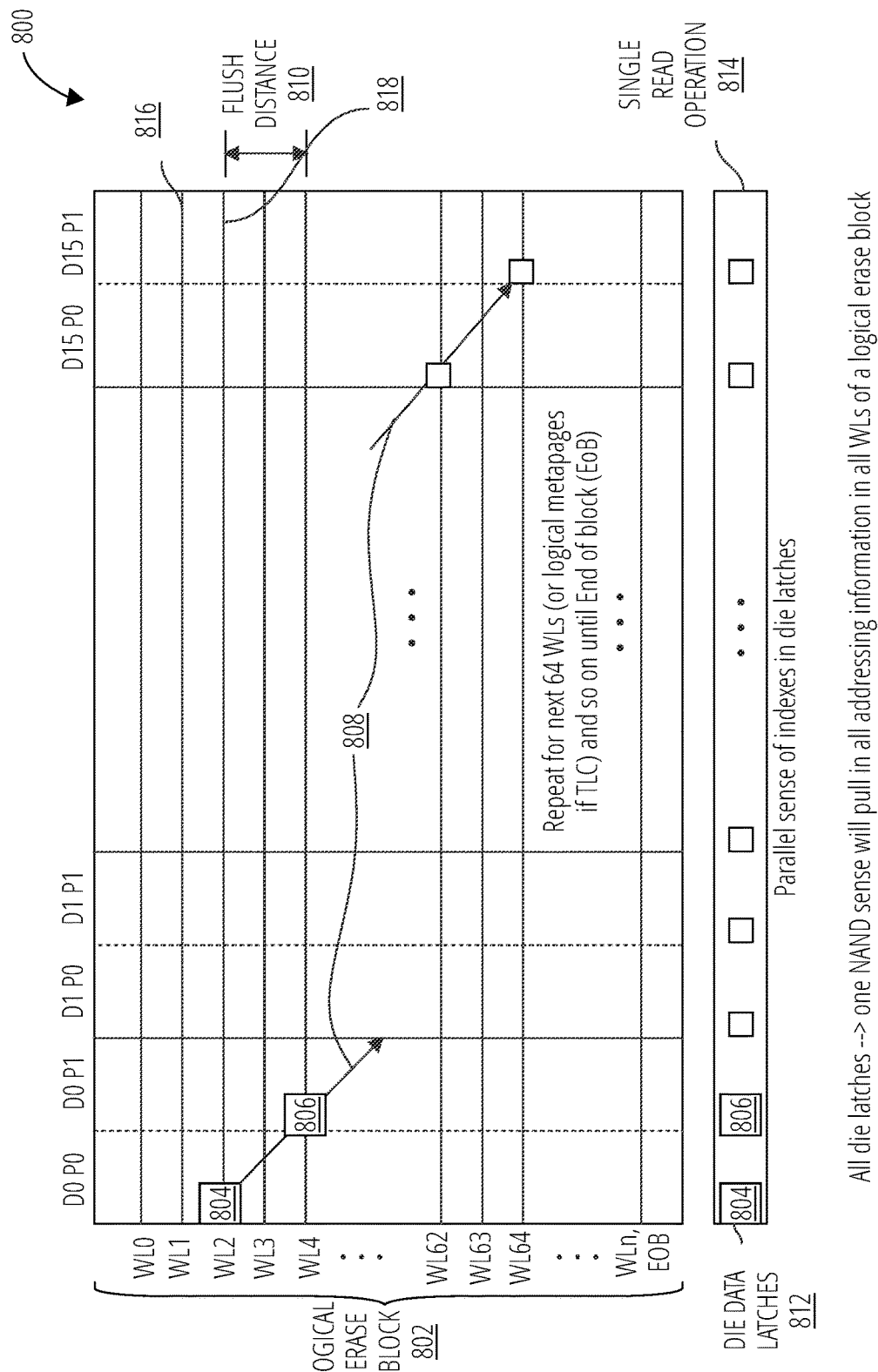
FIG. 8 illustrates a memory array configured for predictable initialization 800 in accordance with one embodiment.

FIG. 8 illustrates a memory array configured for predictable initialization 800 in accordance with one embodiment. A logical erase block 802 includes 16 dies (D0-D15) and includes more than 64 logical word lines. In this embodiment, the fine recovery circuit 604 uses a flush threshold of two logical word lines. In certain embodiments, the recovery unit 520 characterizes a flush threshold as a flush distance. A flush distance is a count of the number of word lines (logical or physical, including data blocks used for any indexes) that are to be written before another index is stored. In FIG. 8, the flush distance 810 is two.

Host device data may be written to the logical erase block 802, starting at logical word line WL0. The recovery unit 520 writes index 804 covering data blocks of written logical word lines WL0 and WL1. The recovery unit 520 writes index 804 a first data block on a subsequent logical word line 818 adjacent to the last programmed logical word line 816, such as on WL2 of Die 0, plane 0 (D0 P0). After the storage controller 104 writes two more logical word lines of data blocks, recovery unit 520 writes a second index 806 is written to D0 P1 covering data blocks of the last programmed logical word lines before WL4 (portions of WL2, WL3, and WL4). For every two word lines of data, an index is stored in a DB to capture logical to physical address mapping for that data.

In another embodiment, the flush distance is one. With a flush distance of one logical word line, and using a zig-zag pattern (described below), index data needed to rebuild the address mapping table is captured more frequently. This means that the time window for recovery from an ungraceful shutdown event is shorter. In an alternate embodiment, the flush threshold (or flush distance) may be set such that a timing metric for initialization after an ungraceful shutdown event may be guaranteed to be met. For example, if a hard limit of 1 second is allowed for a memory device to start up, the memory device may be configured such that in a worst case scenario, all indexes needed to rebuild the address mapping table together with any other initialization steps will take less than 1 second.

The recovery unit 520 may write indexes to DBs in a zig-zag pattern 808, i.e., at the first DB of the next die plane as the word lines are filled, until the first DB of D15 P1 has been used. This zig-zag pattern 808 allows for expeditious reading of information from these DBs at the next start up (initialization operation).

Advantageously, the non-volatile memory array includes sense amplifiers and die data latches 812 positioned at one end of the array (top or bottom or both, at the bottom in FIG. 8). This configuration permits the storage controller 104 to read a whole logical page with one single read operation 814. The single read operation 814 senses the data values stored in each data blocks of the memory cells along the logical page (each cell along each word line of a row of the logical erase block 802). The sensed data values are stored in the die data latches 812 by setting the die data latches 812 to reflect the value in the corresponding memory cells. The fine recovery circuit 604 is configured to request only the data blocks that correspond to the indexes from the memory dies. In this manner each index stored in the non-volatile memory array is read in a single read operation 814. In the depicted embodiment, for a 16-die arrangement, and a flush threshold of two logical word lines, indexes from over 64 logical word lines is reconstructed through a single read cycle.

Advantageously, in certain embodiments, the flush distance (or flush threshold) is adjustable by the recovery unit. In one embodiment, the recovery unit adjusts the flush threshold based on what type of memory cells are used in the non-volatile memory array. For example, the recovery unit may use a larger flush distance if the memory cells are single-level cells because these memory cells tend to be more reliable (e.g., less time required to decode the error correction codes). Conversely, the recovery unit may use a shorter flush distance if the memory cells are multi-level cells because these memory cells tend to be less reliable. In another embodiment, the recovery unit adjusts the flush threshold based on a health metric for a logical word line, a set of logical word lines, a logical erase block, a particular memory die, or the memory array as a whole.

Similarly, the layout used by the recovery unit to store the index may be configurable in the field. In one embodiment, the recovery unit adjusts the layout of indexes in response to changes in the performance requirements expected for the host device.

Referring now to FIG. 8, the recovery unit 520 coordinates with the storage controller to perform an initialization operation. An initialization operation includes among other steps, the loading of an address mapping table into volatile memory that represents the accurate state of logical address mapping information prior to a last shutdown event (graceful or ungraceful). If a storage controller determines that an ungraceful shutdown event has occurred, the storage controller initiates the initialization operation. During the initialization operation, the recovery unit signals the coarse recovery circuit 602 to load the last known correct version of the address mapping table from non-volatile memory to volatile memory. Next, the fine recovery circuit reads each index stored on the non-volatile memory since the last known correct version of the address mapping table was stored. In one example, the recovery circuit reads each index stored on the non-volatile memory using a single read operation. Next, the fine recovery circuit and/or the recovery unit updates a copy of the address mapping table in volatile memory to reflect the changes to logical to physical address mappings as defined in the indexes read during the single read operation. Once the address mapping table in volatile memory, this portion of the initialization operation is completed.

Figure 9:
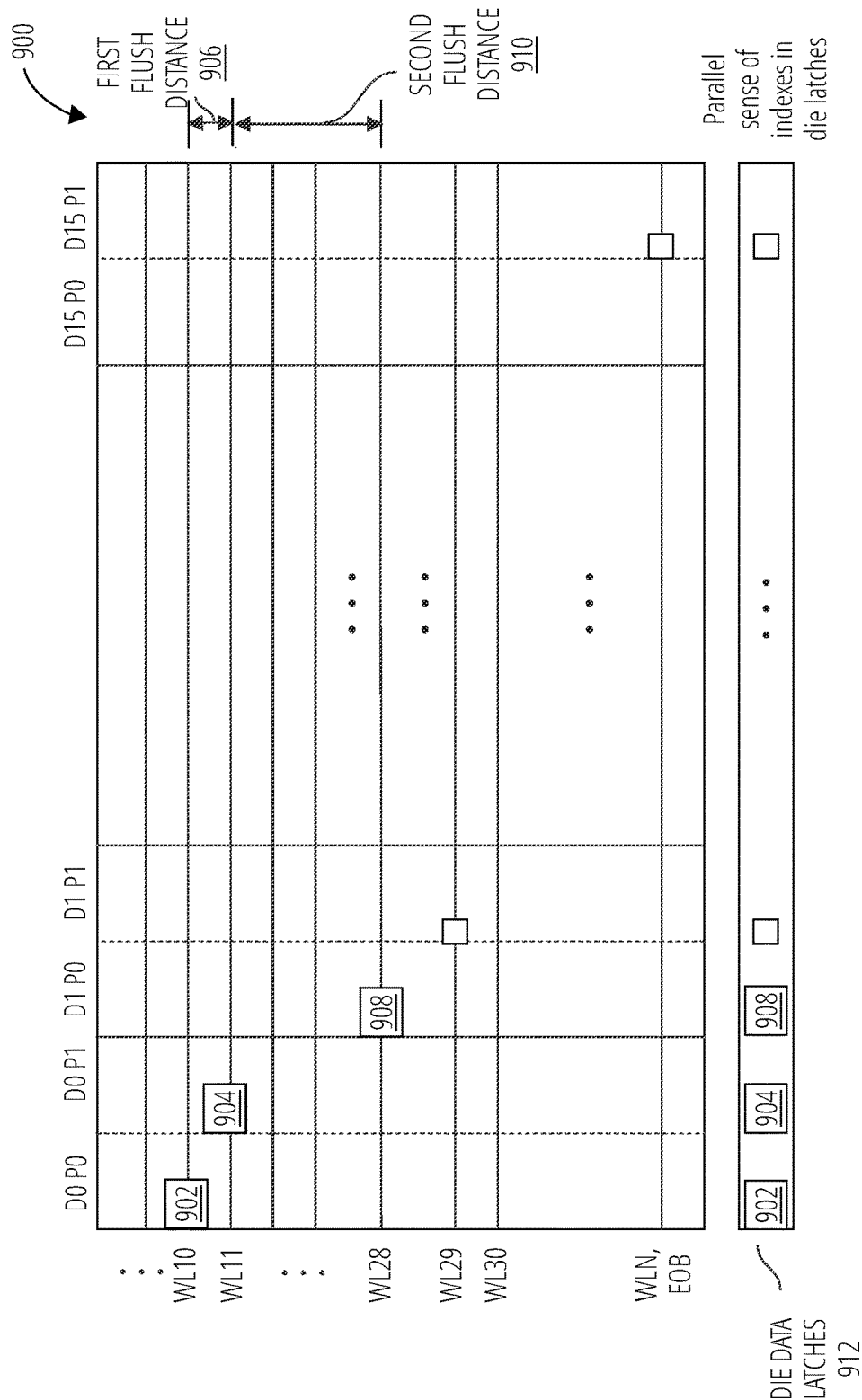
FIG. 9 illustrates a memory array configured for predictable initialization with dynamically tuned flush distances 900 in accordance with one embodiment.

FIG. 9 illustrates a memory array configured for predictable initialization with dynamically tuned flush distances 900 in accordance with one embodiment.

The recovery unit may dynamically configure the flush threshold as an erase block (logical or physical) shows signs of degradation, meaning certain logical word lines are more reliable than others. For unhealthy logical word lines (e.g., WL0-WL11), a first flush distance 906 may be set to a first value of one logical word line, as illustrated in FIG. 8. Should a logical word line (e.g., WL12-WL28) be highly reliable (also known as healthy), a second flush distance 910 may be increased to a second value of three word lines, as shown here.

With a first flush distance 906 of one logical word line and a second flush distance 910 of three word lines, an index 902, a second index 904, and a third index 908 may be written in a zig-zag pattern such that data needed to rebuild the address mapping table may be sensed across die data latches 912 in parallel on startup after an ungraceful shutdown event.

In an alternate embodiment, the flush threshold may be set such that a timing metric for initialization after an ungraceful shutdown event may be guaranteed to be met. For example, if a hard limit of 1 second is allowed for a memory device to start up, the memory device may be configured such that in a worst case scenario, all index information needed to rebuild the address mapping table and perform other initialization steps will take less than 1 second.

In one embodiment, the recovery unit adjusts one or more flush thresholds/flush distances based on a health metric for a logical word line, a set of logical word lines, a logical erase block, a particular memory die, or the memory array as a whole. A health metric is a measure or other indicator that tells how reliable a certain logical word line, set of logical word lines, logical erase block, or memory die are for storing data and retrieving data stored thereon. One health metric that the recovery unit may use is a PE count, also referred to as a frequency of program and erase cycles. A PE count is a measure of how often a logical erase block has been written to and subsequently erased. High PE counts indicate that the non-volatile memory cells have been used a lot and may be worn such that they are now less reliable. A less reliable memory cell may still be used to store and read data, however certain error recovery techniques may be required which increases the latency for doing the read operations. Another health metric that the recovery unit may use is a Bit Error Rate (BER) for data blocks within the logical erase block. In certain embodiments, the recovery unit may use is an average BER for data blocks within the logical erase block.

Figure 10:
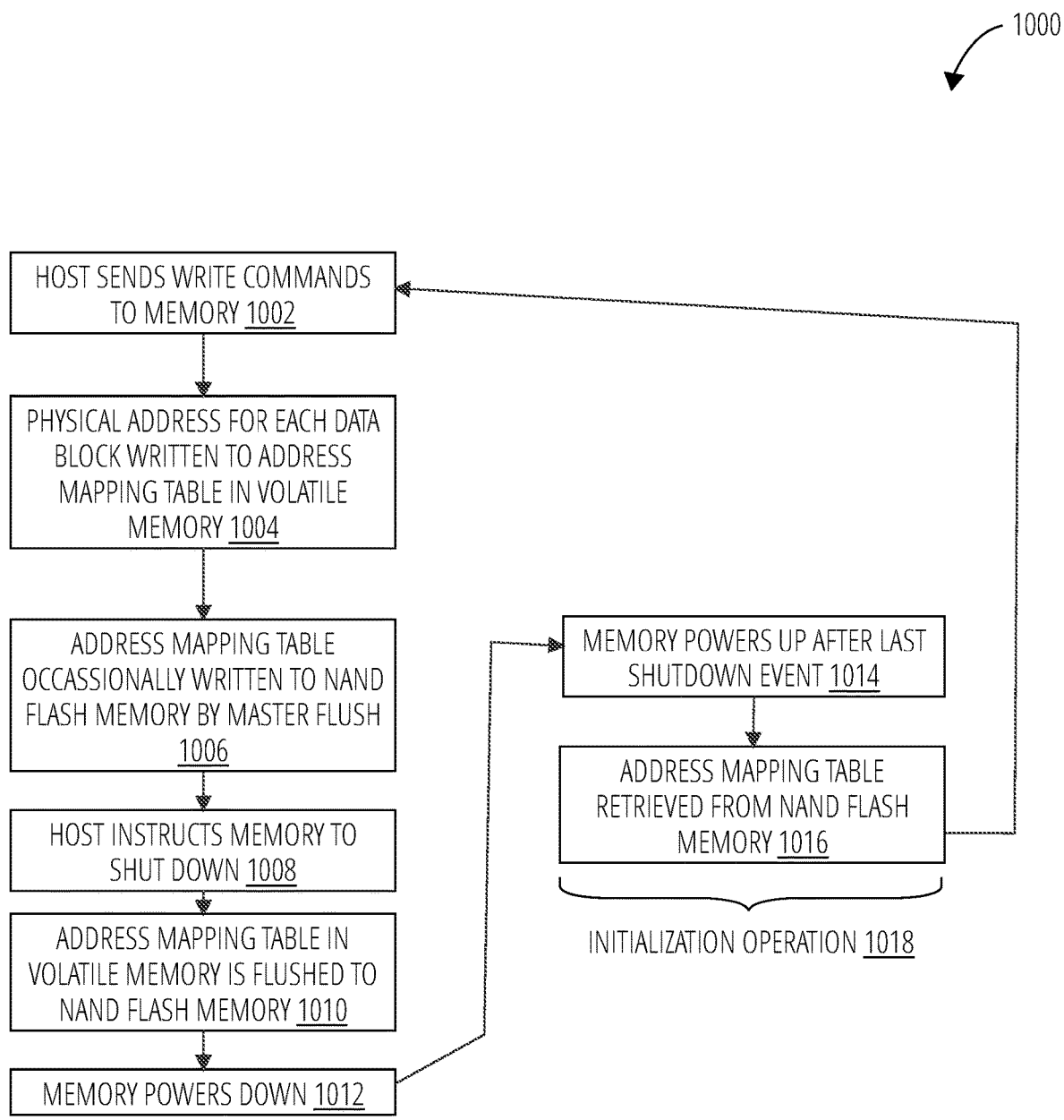
FIG. 10 illustrates a prior art graceful shutdown event process 1000 in accordance with one embodiment.

FIG. 10 illustrates a prior art graceful shutdown event process 1000 in accordance with one embodiment.

During normal operation, a host device sends write commands to a memory device (step 1002). The memory device maintains an address mapping table in volatile memory. In step 1004, when data is written to memory, the address mapping table is updated with entries that correlate the logical block addresses for each data block with the physical locations of those data blocks in the memory device. Periodically, the address mapping table is "flushed" from volatile memory to the NAND flash memory by a master flush operation (step 1006).

A graceful shutdown event occurs when the host device indicates to the memory device that it is shutting down, and instructs the memory to shut down likewise (step 1008). The address mapping table in volatile memory is saved to the NAND flash memory (step 1010) before the memory powers down (step 1012).

After a graceful shutdown event, the initialization operation 1018 performed at the next start up may be very brief. the memory device simply powers up (step 1014) and the address mapping table is retrieved from the NAND flash memory (step 1016).

Figure 11:
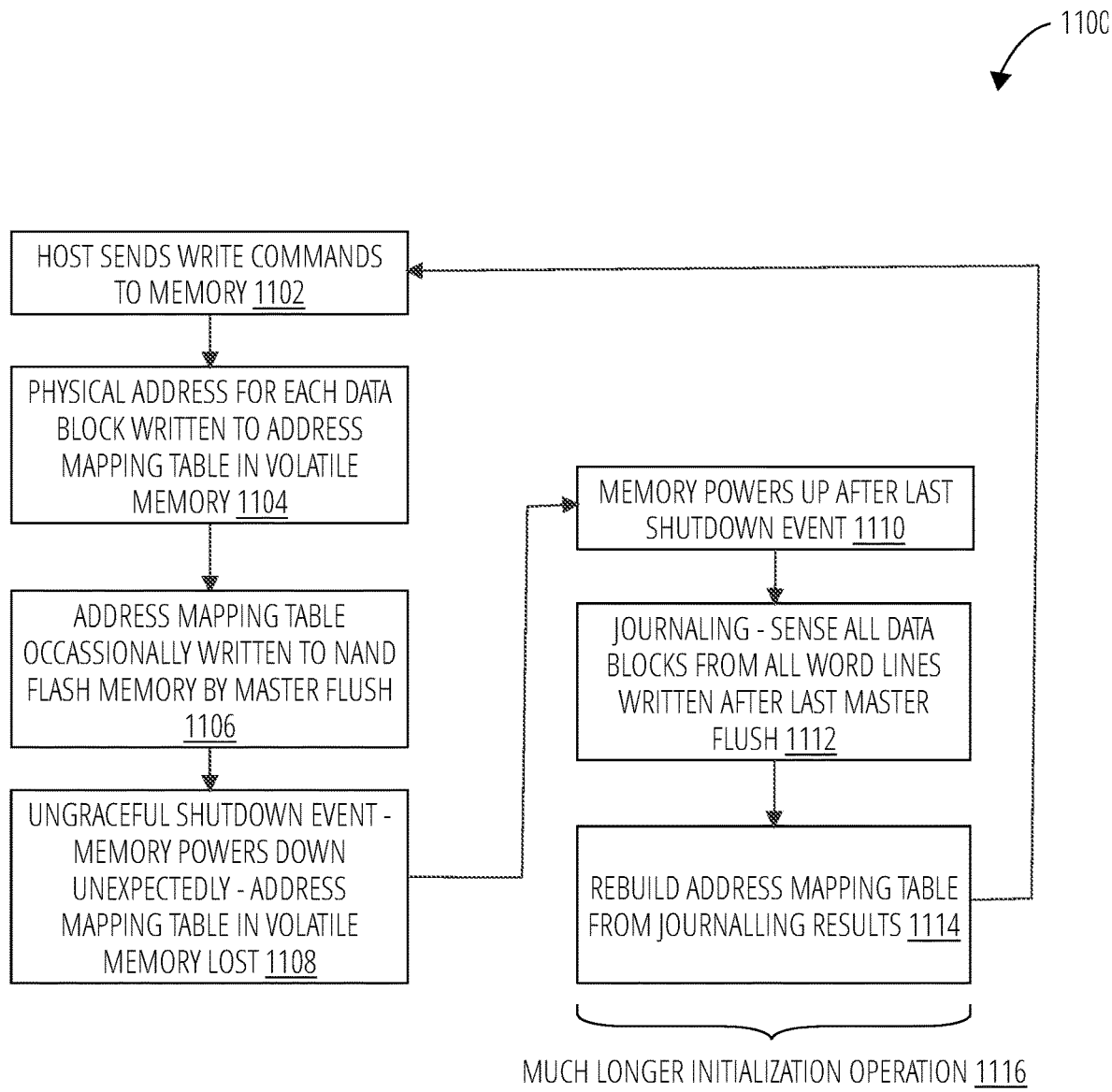
FIG. 11 illustrates a prior art ungraceful shutdown event process 1100 in accordance with one embodiment.

FIG. 11 illustrates a prior art ungraceful shutdown event process 1100 in accordance with one embodiment.

Normal operation shown in step 1102, step 1104, and step 1106, are identical to the operation illustrated in FIG. 10. However, in an ungraceful shutdown event, no warning is received from the host device, and the memory powers down unexpectedly (step 1108). As a result, the address mapping table in volatile memory is not flushed to NAND flash memory, and is therefore lost.

This may result in a much longer initialization operation 1116 when the memory powers up again (step 1110). When the last shutdown event was an ungraceful shutdown event, the memory device must perform a journaling operation (step 1112) at startup. During journaling, all DBs written subsequent to the last master flush must be reviewed to determine the logical block address for each physical address of each data block, and a log table or address mapping table must be reconstructed from these journaling results (step 1114).

The time required for this journaling depends on how much data was written after the last master flush occurred. In some cases, journaling may take several seconds. In systems that permit a limited time for memory initialization, this journaling may push memory start up out of required bounds and cause a system error or failure.

Figure 12:
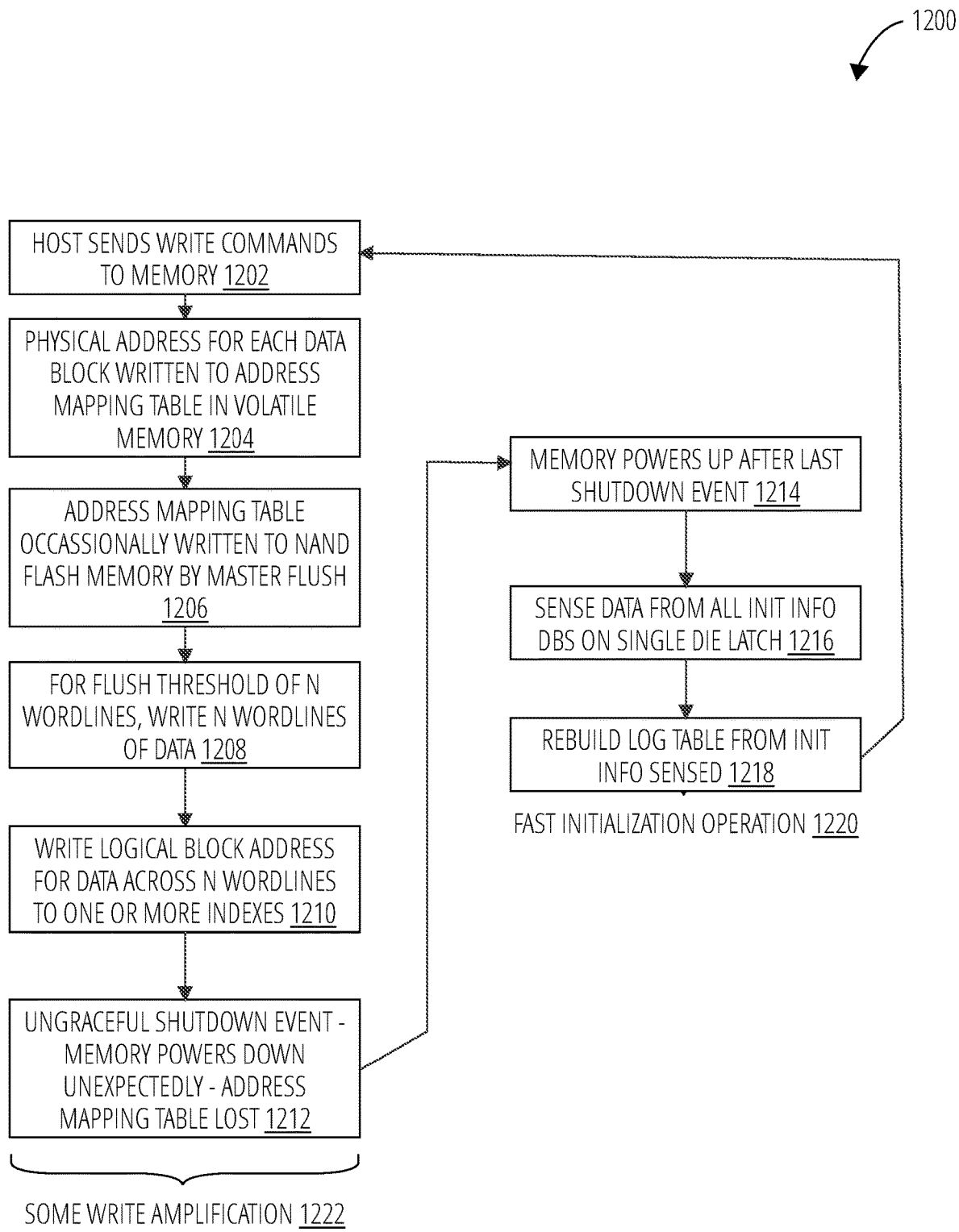
FIG. 12 illustrates a write, ungraceful shutdown event, and initialization process 1200 in accordance with one embodiment.

FIG. 12 illustrates a write, ungraceful shutdown event, and initialization process 1200 in accordance with one embodiment. As in FIG. 10 and FIG. 11, as normal operation proceeds, the host device sends write commands to the memory device to write data for storage (step 1202). The relationship between logical block addresses and physical addresses for the data blocks written are recorded in the address mapping table in volatile memory (step 1204). Periodically the address mapping table is flushed to memory (step 1206).

Through the method and apparatus disclosed herein, a flush threshold of N word lines (either logical or physical) may be predefined or dynamically set or dynamically adjusted. As data is written to memory (step 1208), for every N word lines written, the logical block address to physical address mapping for those N word lines is written into an index on the next word line (step 1210). This incurs some write amplification 1222 during operation, as additional data is regularly written to the memory array. However, should memory power down unexpectedly, causing the address mapping table in volatile memory to be lost (step 1212), a much fast initialization operation 1220 is possible. When the memory device powers up again (step 1214), indexes are read for data block on the memory array, every N word lines (step 1216).

In one embodiment, the recovery unit determines that an ungraceful shutdown event has occurred. The coarse recovery circuit reads the address mapping table from non-volatile memory into volatile memory. the fine recovery circuit reads one or more indexes in one read operation from the non-volatile memory and loads the index information. The fine recovery circuit may then updates the address mapping table to associate logical block addresses contained in the indexes (either explicitly or implicitly) with the physical addresses contained in the indexes (either explicitly or implicitly) for data blocks stored since the address mapping table was stored in non-volatile memory. The recovery unit performs the determining, reading steps and updating steps fast enough that an initialization operation completes within a defined timing metric.

In this manner, the address mapping table in volatile memory may be rebuilt based on the indexes sensed, in addition to whatever was recorded at the last master flush (step 1218). The need for journaling to review individual DBs may be limited to the relatively small number of DBs written after the index was written.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method, comprising:
    writing data blocks to word lines across a first plane and a second plane of a memory array;
    generating a first index that relates a logical block address and a physical address for certain data blocks written to the memory array;
    storing the first index to a subsequent word line of the first plane, in response to a number of the data blocks written to the memory array satisfying a flush threshold;
    generating a second index that relates a logical block address and a physical address for certain data blocks written to the memory array; and
    storing the second index to a subsequent word line of the second plane, in response to the number of the data blocks written to the memory array satisfying the flush threshold.

2. The method of claim 1, further comprising recovering an address mapping table for the memory array by reading the first index and second index concurrently such that an initialization operation satisfies a timing metric.

3. The method of claim 1, further comprising storing an address mapping table periodically on the memory array.

4. The method of claim 1, wherein the index comprises a relationship between the logical block addresses and the physical addresses for the data blocks written after storage of an address mapping table on the memory array.

5. The method of claim 1, wherein the memory array comprises an array of memory die, each memory die comprising a physical erase block comprising the word lines, the array of memory die comprising a logical erase block comprising a physical erase block from each of the memory dies, wherein the flush threshold comprises a number of data blocks that fill a logical word line of the logical erase block and the subsequent word line comprises a logical word line adjacent to a last programmed logical word line.

6. The method of claim 1, further comprising:
    in response to determining that a last shutdown event was an ungraceful shutdown event, executing an initialization operation, the initialization operation comprising:
        reading an address mapping table from the memory array into volatile memory;
        reading one or more indexes from the memory array using a single read operation, the one or more indexes stored after the address mapping table was written to the memory array; and
        updating the address mapping table in the volatile memory to associate the logical block addresses of the one or more indexes with the data blocks stored on the memory array after the address mapping table was written to the memory array.

7. The method of claim 1, further comprising:
    setting the flush threshold to a first value in response to memory cells of the memory array comprising single-level cells; and
    setting the flush threshold to a second value in response to the memory cells of the memory array comprising multi-level cells.

8. The method of claim 1, further comprising configuring the flush threshold based on a health metric for the memory array.

9. The method of claim 8, wherein the health metric comprises a frequency a physical erase block comprising the word lines has completed a program and erase cycle.

10. The method of claim 1, wherein storing the first index comprises writing the first index to a data block of the subsequent word line at a predefined location and wherein storing the second index comprises writing the second index to a data block of the subsequent word line at another predefined location.

11. The method of claim 10, in response to the number of the data blocks satisfying the flush threshold:

writing a second set of data blocks to word lines across a first plane, a second plane, and a third plane of the memory die;

generating a third index that relates the logical block address for data blocks of the second set of data blocks and the physical address of data blocks of the second set of data blocks on the memory die; and writing the third index to the subsequent word line, in response to a number of the data blocks of the second set of data blocks satisfying the flush threshold.

12. The method of claim 11, wherein the first index, the second index, and the third index are written such that a single read operation reads the first index, the second index, and the third index.

13. The method of claim 1, wherein the flush threshold comprises a flush distance, the flush distance comprising a number of the word lines of the data blocks to track by way of an index.

* * * * *